(12) United States Patent
Oya

(10) Patent No.: US 11,489,467 B2
(45) Date of Patent: Nov. 1, 2022

(54) MOTOR CONTROL APPARATUS

(71) Applicant: KABUSHIKI KAISHA YASKAWA DENKI, Kitakyushu (JP)

(72) Inventor: Hiroaki Oya, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 0 days.

(21) Appl. No.: 17/210,528

(22) Filed: Mar. 24, 2021

(65) Prior Publication Data
US 2021/0305924 A1 Sep. 30, 2021

(30) Foreign Application Priority Data
Mar. 24, 2020 (JP) .............................. JP2020-052605

(51) Int. Cl.
*H02P 6/30* (2016.01)
*B66B 1/30* (2006.01)
*B66B 5/02* (2006.01)
*H02P 6/22* (2006.01)

(52) U.S. Cl.
CPC .................. *H02P 6/30* (2016.02); *B66B 1/30* (2013.01); *B66B 5/02* (2013.01); *H02P 6/22* (2013.01)

(58) Field of Classification Search
CPC . H02P 6/30; H02P 27/06; H02P 21/06; B66B 1/30; B66B 5/02
See application file for complete search history.

(56) References Cited

U.S. PATENT DOCUMENTS 6,677,724 B1 * 1/2004 Kim .......................... H02P 6/18
318/811

FOREIGN PATENT DOCUMENTS

| JP | 2003-88154 | | 3/2003 |
| JP | 4677697 B2 | | 3/2003 |
| JP | 2003088154 A | * | 3/2003 |
| JP | 2004-15849 | | 1/2004 |
| JP | 2014-155356 | | 8/2014 |
| JP | 6547909 B1 | | 7/2019 |
| WO | WO 2016/157391 | | 10/2016 |

OTHER PUBLICATIONS

Japanese Office Action for corresponding JP Application No. 2020-052605, dated Apr. 16, 2021 (w/ English machine translation).
Extended European Search Report for corresponding EP Application No. 21164663.3-1202, dated Aug. 3, 2021.

* cited by examiner

*Primary Examiner* — Said Bouziane
(74) *Attorney, Agent, or Firm* — Mori & Ward, LLP

(57) ABSTRACT

A motor control apparatus includes control circuitry and rotation direction adjusting circuitry. The control circuitry is configured to output, in accordance with a phase sequence with respect to a motor, a drive command signal which is generated based on a motor rotation signal output from a motor rotation detector to control the motor. The rotation direction adjusting circuitry is configured to match the phase sequence with rotation direction information included in the motor rotation signal if a first trouble signal showing excessive motor current or excessive motor speed is input via an operation unit.

15 Claims, 18 Drawing Sheets

FIG. 6

Signal Switching Table
(in a case where phase sequence of U-Phase and W-phase is replaced)

| | U1 | U2 | V1 | V2 | W1 | W2 |
|---|---|---|---|---|---|---|
| Absence of Inputting Phase Sequence Switching Signal | QUu | QUd | QVu | QVd | QWu | QWd |
| Presence of Inputting Phase Sequence Switching Signal | QWu | QWd | QVu | QVd | QUu | QUd |

Phase Sequence of U-Phase and V-phase is replaced

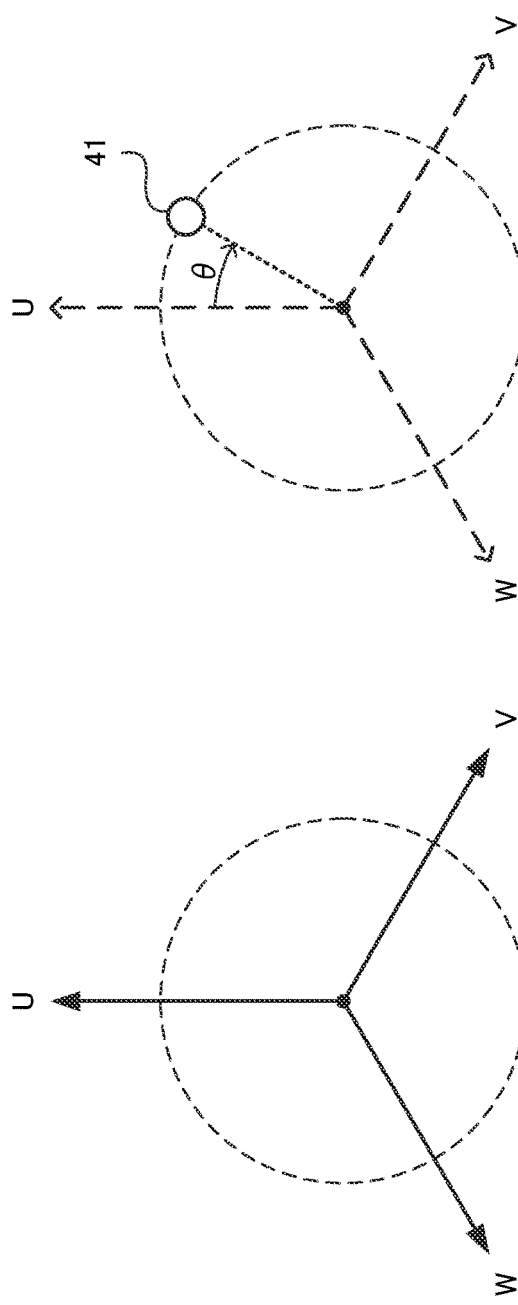

FIG. 10A

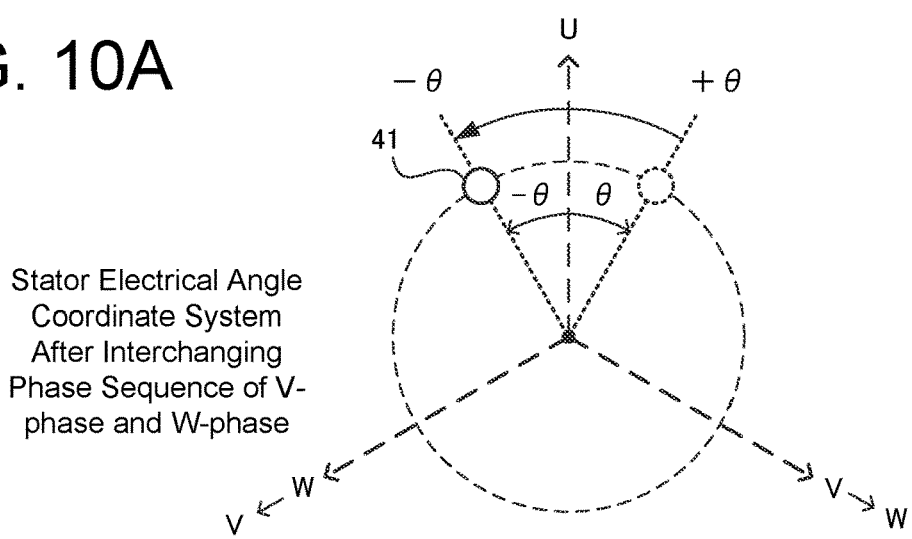

Stator Electrical Angle Coordinate System After Interchanging Phase Sequence of V-phase and W-phase

FIG. 10B

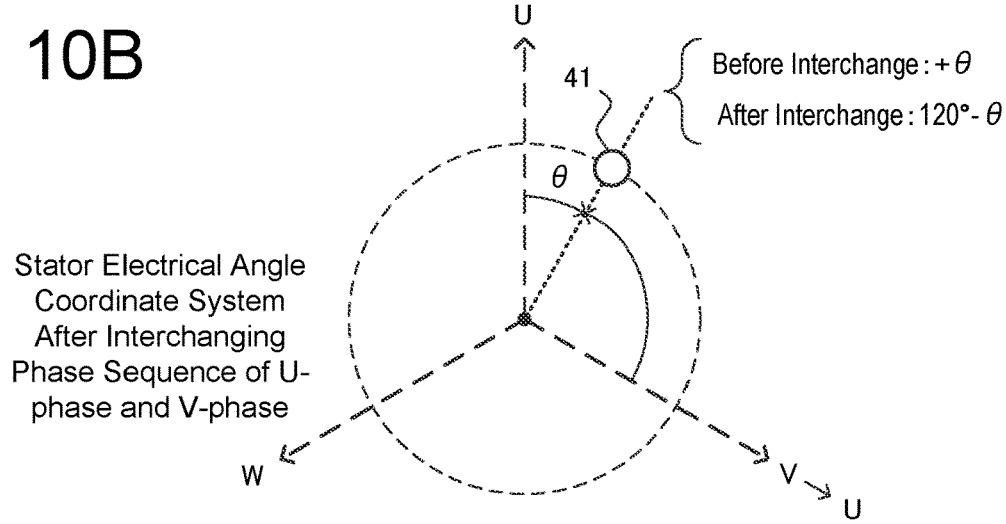

Stator Electrical Angle Coordinate System After Interchanging Phase Sequence of U-phase and V-phase Before Interchange: $+\theta$
After Interchange: $120°-\theta$

FIG. 10C

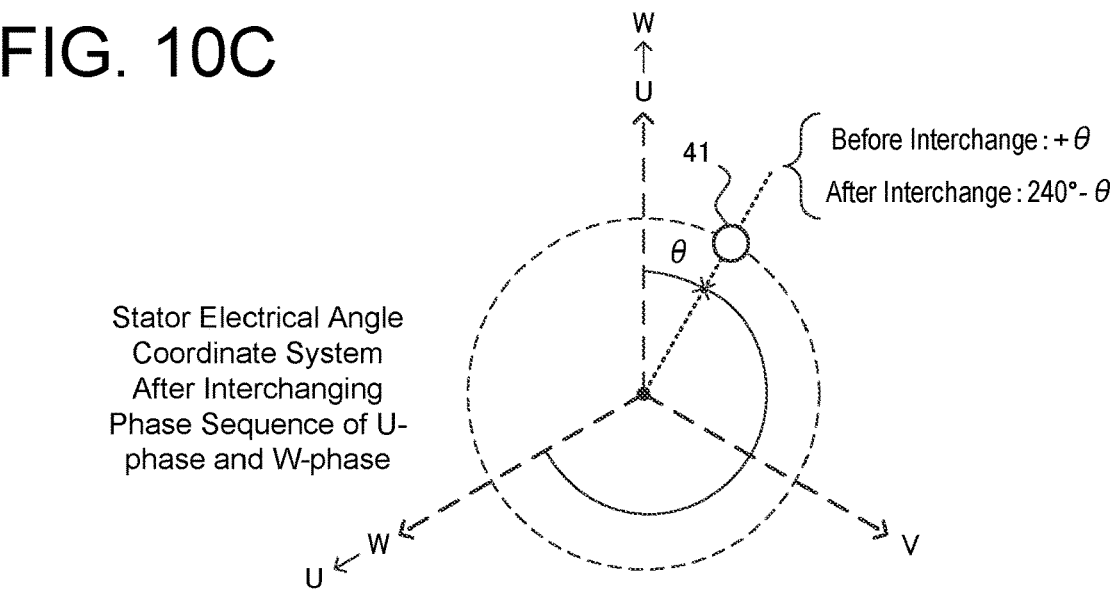

Stator Electrical Angle Coordinate System After Interchanging Phase Sequence of U-phase and W-phase Before Interchange: $+\theta$
After Interchange: $240°-\theta$

MOTOR CONTROL APPARATUS

CROSS-REFERENCE TO RELATED APPLICATIONS

The present application claims priority under 35 U.S.C. § 119 to Japanese Patent Application No. 2020-052605, filed Mar. 24, 2020. The contents of this application are incorporated herein by reference in their entirety.

BACKGROUND

Field of the Invention

The embodiment of this disclosure relates to a motor control apparatus.

Discussion of the Background

Japanese Patent No. 6547909 discloses a motor control apparatus that determines whether or not a motor control circuit is operating normally by comparing an operation waveform during an elevator operation with a normal waveform.

For example, when an elevator that is a motor drive mechanism is newly installed, the motor for lifting and lowering the elevator car and the motor control apparatus that controls the motor are often combined at the construction site for the first time. For this reason, in an operation stage after completion of installation and wiring, the motor may rotate in a direction opposite to a direction intended by an operator, or the motor may not rotate even though a current flow. When such a trouble occurs, it is difficult to identify the cause at the construction site and quickly take appropriate measures.

SUMMARY OF THE INVENTION

According to one aspect of the present invention, a motor control apparatus includes control circuitry and rotation direction adjusting circuitry. The control circuitry is configured to output, in accordance with a phase sequence with respect to a motor, a drive command signal which is generated based on a motor rotation signal output from a motor rotation detector to control the motor. The rotation direction adjusting circuitry is configured to match the phase sequence with rotation direction information included in the motor rotation signal according to a first trouble signal output from an operation unit showing excessive motor current or excessive motor speed.

According to another aspect of the present invention, a motor control apparatus includes control circuitry configured to output, in accordance with a phase sequence with respect to a motor, a drive command signal which is generated based on a motor rotation signal output from a motor rotation detector to control the motor; and rotation direction reversing circuitry configured to perform rotation direction reversing process to reverse a motor rotation direction with respect to the drive command signal according to a second trouble signal showing a rotation direction error of the motor.

According to further aspect of the present invention, a motor control apparatus includes control circuitry configured to output, in accordance with a phase sequence with respect to a motor, a drive command signal which is generated based on a motor rotation signal output from a motor rotation detector to control the motor; confirmation operation command circuitry configured to command the control circuitry to perform a confirmation operation for starting and stopping the motor in response to a third trouble signal caused by excessive current or excessive speed of the motor or erroneous rotation direction of the motor; trouble decision circuitry configured to determine whether the motor is in an excessive current state or an excessive speed state during the confirmation operation; and trouble solution circuitry configured to solve a trouble corresponding to the third trouble signal based on the determination result of the trouble decision circuitry. When the trouble decision circuitry determines that the motor is in an excessive current state or an excessive speed state, the trouble solution circuitry performs a rotation direction adjusting process for matching a predetermined motor phase sequence used by the control circuitry outputting the drive command signal with rotation direction information included in the motor rotation signal. When the motor is determined to be neither in an excessive current state nor in an excessive speed state, the trouble solution circuitry performs a rotation direction reversing process for reversing the rotation direction of the motor with respect to the drive command signal.

BRIEF DESCRIPTION OF THE DRAWINGS

FIG. 6 is a diagram showing an example of a signal interchanging table.

FIGS. 9A, 9B, and 9C are diagrams showing an example of a relationship between a detection origin and a magnetic pole position in an electrical angle coordinate system.

FIGS. 10A, 10B, and 10C are diagrams showing an example of the corrected position of the detection origin when the sequence of the phases other than the reference phase is changed and when the sequence of the phases including the reference phase is changed.

DESCRIPTION OF THE EMBODIMENTS

Hereinafter, embodiments will be described with reference to the drawings.

1: Schematic Configuration of Elevator Drive System

Figure 1:
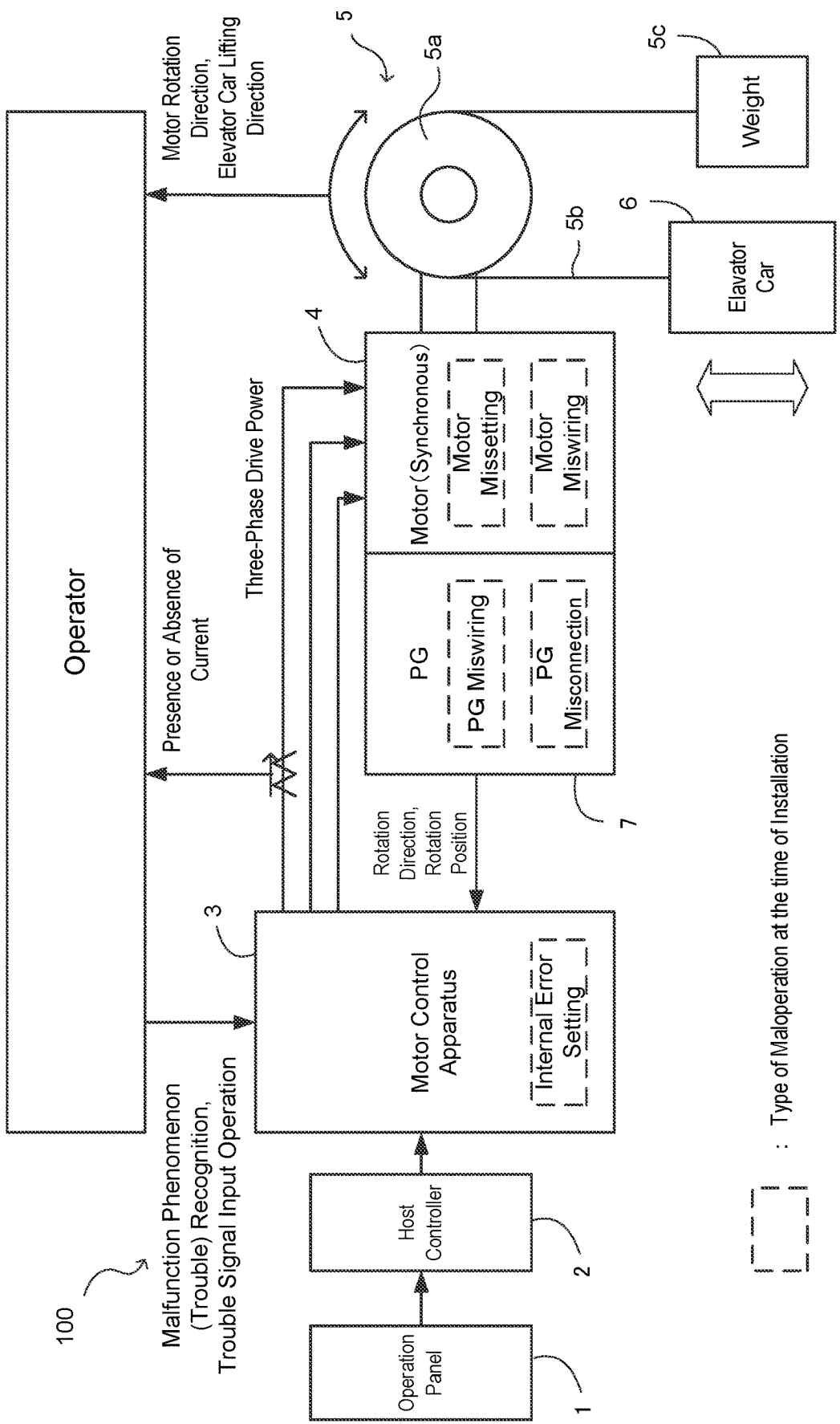
FIG. 1 is a diagram showing an example of a schematic system block configuration of an entire elevator drive system according to an embodiment.

First, referring to FIG. 1, a system block configuration of an entire elevator drive system including a motor control apparatus according to the present embodiment will be described. As shown in FIG. 1, the elevator drive system 100 includes an operation panel 1, a host controller 2, a motor control apparatus 3, a motor 4, a lifting mechanism 5, and an elevator car 6.

The operation panel 1 receives an operation input from a user (not particularly illustrated) who uses the elevator drive system 100, and outputs the operation input designating a target floor to which the elevator car 6 moves up or down. Generally, a plurality of operation panels 1 is installed inside the elevator car 6 and near the entrance of each floor, but in FIG. 1, one operation panel 1 is shown outside the elevator car 6 in order to avoid complexity of illustration.

The host controller 2 is constituted by a computer system including, for example, a CPU, ROM's, RAM's, and the like, and outputs control commands such as a position command and a speed command to the motor control apparatus 3 based on the current floor position (floor position at that time) of the elevator car 6 which is separately detected and managed and the target floor position of the elevation movement destination designated by the operation panel 1. In the example of the present embodiment, a speed command is output as the control command.

The motor control apparatus 3 is configured by a computer including a CPU, a ROM, a RAM, and the like. The motor control apparatus 3 controls drive power supplied to the motor 4 based on a control command (speed control command) input from the host controller 2 with reference to a rotational position and a rotational direction of the motor 4 detected by an encoder 7 (abbreviated as "PG" in the drawing) described later. The internal configuration of the motor control apparatus 3 will be described in detail later with reference to FIG. 2.

The motor 4 is, for example, a synchronous motor driven by a three-phase alternating current in the present embodiment, and its rotational speed and rotational direction are controlled by drive power supplied from the motor control apparatus 3. An encoder 7 (corresponding to a motor rotation detector) is mechanically coupled to the motor 4. The encoder 7 detects a rotation amount and a rotation direction of the motor 4 and outputs these detected information to the motor control apparatus 3. The rotation amount is, for example, a rotation speed or a rotation angle of a rotor of the motor 4. The output of the encoder 7 is, for example, a pulse signal corresponding to the rotation amount and rotation direction of the motor 4. The motor 4 is not limited to a synchronous motor and may be. for example, an induction motor or a direct current motor.

The lifting mechanism 5 is a mechanical system including a reduction gear (not particularly shown) coupled to an output shaft of the motor 4, a pulley 5a, a wire 5b, a counter weight 5c, and the like. The lifting mechanism 5 is driven by the motor 4 to perform an elevating operation of an elevator car 6 on which users ride while balancing with the counter weight 5c.

2: Internal Configuration of Motor Control Apparatus

Figure 2:
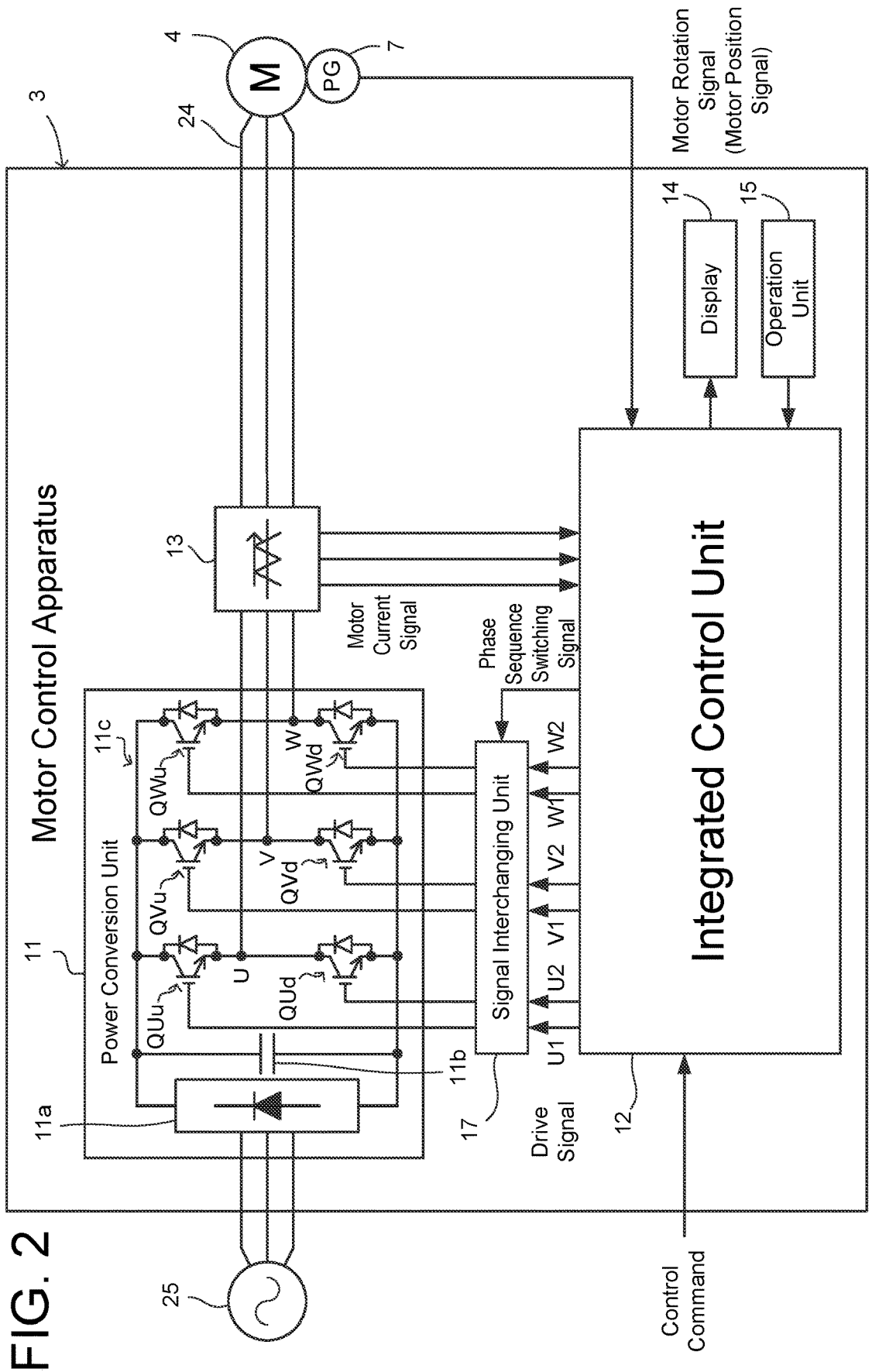
FIG. 2 is a diagram showing an example of an internal block configuration of the motor control apparatus.

Next, referring to FIG. 2 of a block configuration diagram, an internal configuration of the motor control apparatus 3 will be described. In FIG. 2, the motor control apparatus 3 includes a power conversion unit 11, an integrated control unit 12, a current sensor 13, a display unit 14, an operation unit 15, and a signal interchanging unit 17.

The power conversion unit 11 includes a rectifier bridge 11a with diodes or switching elements, a smoothing capacitor 11b, and an inverter bridge 11c including, for example, semiconductor switching elements Q (six in total) of an upper arm and a lower arm corresponding to each of three phases of a U-phase, a V-phase, and a W-phase. AC power supplied from a three-phase AC power supply 25 which supplies commercial power is converted into DC power by a rectifier bridge 11a and supplied to a DC bus. The inverter bridge 11c turns on and off of each semiconductor switching element Q by a switch drive signal input from a drive control unit 16 ("control circuitry" recited in claims) described later (see FIG. 3), thereby makes PWM-converting of the DC power supplied from the DC bus into drive power corresponding to three-phase AC in a predetermined phase sequence and supplying the drive power to the motor 4. When the motor 4 is a DC motor, the power conversion unit 11 may include a single-phase bridge (configured by a total of four semiconductor switching elements Q) that outputs two phases of a P phase and an N phase instead of the inverter bridge 11c.

The integrated control unit 12 is a software block executed by the CPU of the motor control apparatus 3. The integrated control unit 12 performs various processes based on the output of the encoder 7, a motor current signal input from a current sensor 13 to be described later, and a signal input from an operation unit 15 to be described later, thereby controls entirely the motor control apparatus 3 such as turning on and off each semiconductor switching element Q in the inverter bridge 11c and displaying various information on a display unit 14 to be described later. The internal processing of the integrated control unit 12 will be described later in detail with reference to FIG. 3.

The current sensor 13 detects, as a motor current signal, a current value that flows when drive power is supplied from the power conversion unit 11 to the motor 4 via the power supply line 24, and outputs the motor current signal to the integrated control unit 12.

Figure 3:
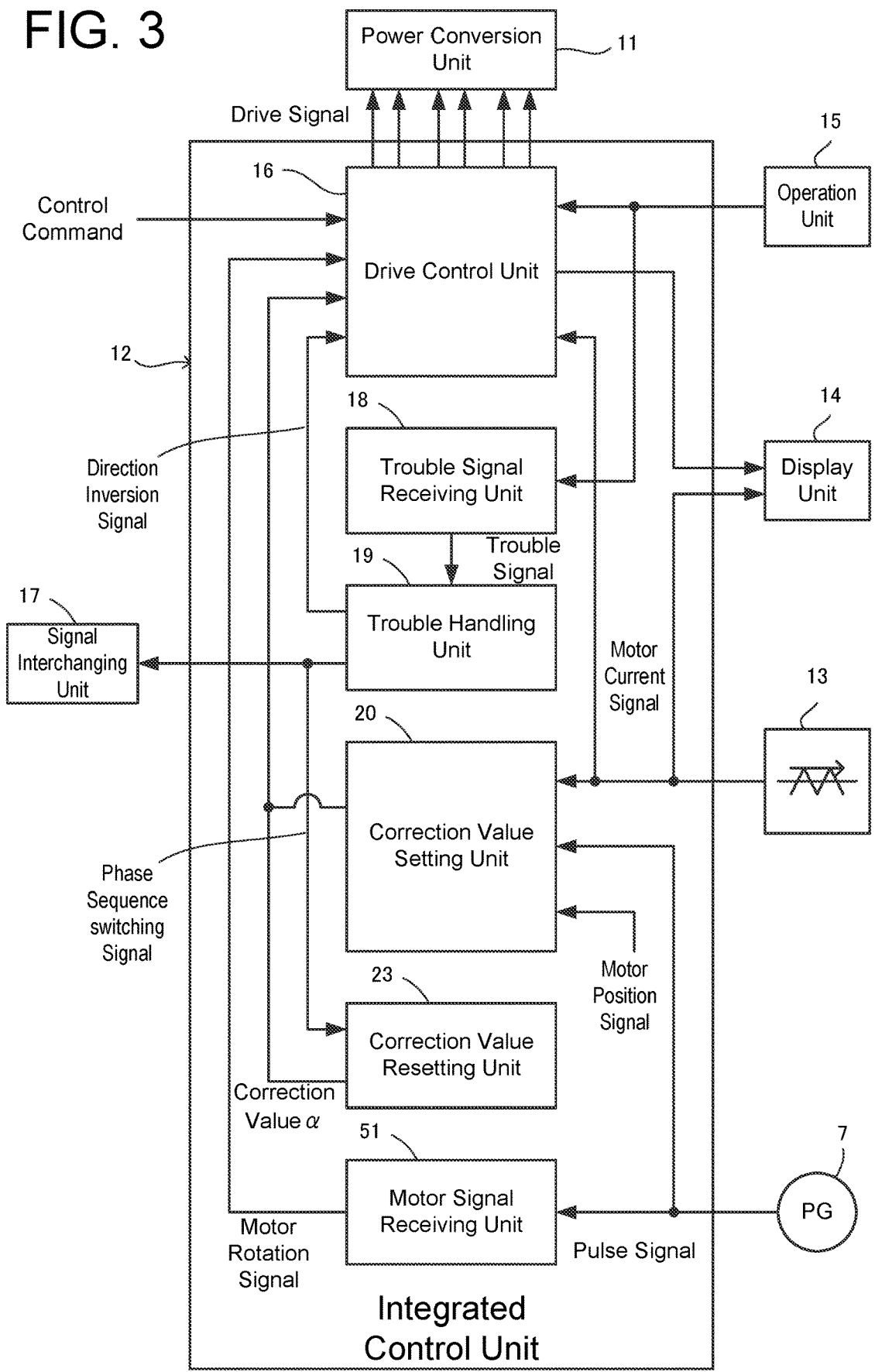
FIG. 3 is a diagram showing an example of the internal block configuration of the integrated control unit.

The display unit 14 is connected to the integrated control unit 12 and functions to deliver displays of various kinds of information to an operator described later, and displays a current value based on the motor current signal detected by the current sensor 13 as one of the displayed information (see FIG. 3 described later).

In this example, the operation unit 15 is configured separately from the display unit 14 and includes cursor keys and other function keys (not shown), and functions to receive various input operations from the operator. Although not particularly shown, the operation unit 15 and the display unit 14 may be integrally configured, or may be configured as a touch panel display. At least one of the operation unit 15 and the display unit 14 may be configured by a personal computer or an engineering tool separately provided outside the apparatus. In response to a key operation on the operation unit 15, the operation unit 15 generates a signal corresponding to the operation content and outputs the signal to the integrated control unit 12 (see FIG. 3 described later).

Based on the phase sequence interchanging signal from the integrated control unit 12, the signal interchanging unit 17 interchanges the phase sequence when generating six switch drive signals corresponding to the semiconductor switching elements Q of the inverter bridge 11*c* from a drive command signal described later. The function of the signal interchanging unit 17 will be described later in detail with reference to FIG. 6.

Next, referring to FIG. 3 of the block diagram, the internal processing of the integrated control unit 12 will be described. In FIG. 3, the integrated control unit 12 includes a drive control unit 16, a trouble signal receiving unit 18, a trouble handling unit 19, a correction value setting unit (correction value setting circuitry) 20, and a motor signal receiving unit 51. When the motor 4 is a synchronous motor, the integrated control unit 12 may further includes a correction value resetting unit (correction value resetting circuitry) 23.

The drive control unit 16 generates a drive command signal for the motor 4 based on the control command (speed command in this example) input from the host controller 2 while referring to the motor rotation signal input via the encoder 7 and the motor signal receiving unit 51 and the motor current signal input from the current sensor 13. The drive command signal is a voltage command signal in the case where the power conversion unit 11 is a voltage-type power conversion device, and is a current command signal in the case of where the power conversion unit 11 is a current-type power conversion device. A drive control unit 16 allocates the drive command signal in a predetermined phase sequence of the motor 4, and generates and outputs a switch drive signal for turning on and off to each semiconductor switching element Q of the inverter bridge 11*c* based on the allocated drive command signal. The internal processing of the drive control unit 16 will be described later in detail with reference to FIG. 4. Further, in the processing in the drive control unit 16, higher priority control including start and stop thereof based on a signal from the operation unit 15 is conducted, and various information generated at that time is output to the display unit 14 and is displayed (not particularly shown).

The trouble signal receiving unit 18 receives a trouble signal input through the operation unit 15 and outputs the trouble signal to the trouble handling unit 19 described later.

The trouble handling unit 19 distributes and outputs the phase sequence switching signal and the direction inversion signal to each of the drive control unit 16, the signal interchanging unit 17, and the correction value resetting unit 23 described later in accordance with the type of the trouble signal input from the trouble signal receiving unit 18, that is, in accordance with the content of the trouble. The functional configuration of the trouble handling unit 19 will be described later in detail with reference to FIG. 8.

The correction value setting unit 20, which may be employed when the motor 4 is a synchronous motor, calculates a correction value for the magnetic pole position signal obtained based on the motor rotation signal input from the encoder 7 via the motor signal receiving unit 51 at a timing when the detection origin signal of the encoder 7 is generated within a predetermined period, and outputs the correction value to the drive control unit 16. The processing content of the correction value setting unit 20 will be described in detail later.

The correction value resetting unit 23 may be employed when the motor 4 is a synchronous motor, and resets the correction value calculated by the correction value setting unit 20 only when the phase sequence switching signal is input from the trouble handling unit 19, and outputs the correction value to the drive control unit 16. The processing contents of the correction value resetting unit 23 will also be described in detail later.

The above-described processes performed by the drive control unit 16, the signal interchanging unit 17, the trouble signal receiving unit 18, the trouble handling unit 19, the motor signal receiving unit 51, the correction value setting unit 20, the correction value resetting unit 23, and the like are not limited to this example of sharing the processes, and may be performed by a smaller number of control devices or may be performed by more differentiated control devices. The processing of the motor control apparatus 3 may be implemented by a program executed by a CPU901 (see FIG. 18) described later, or a part or all of the processing may be implemented by a specific integrated circuits such as an ASIC, or an FPGA, or hardware of other electric circuits.

The above-described drive control unit 16 corresponds to the control unit described in each claim.

3: Control Processing in Drive Control Unit

Figure 4:
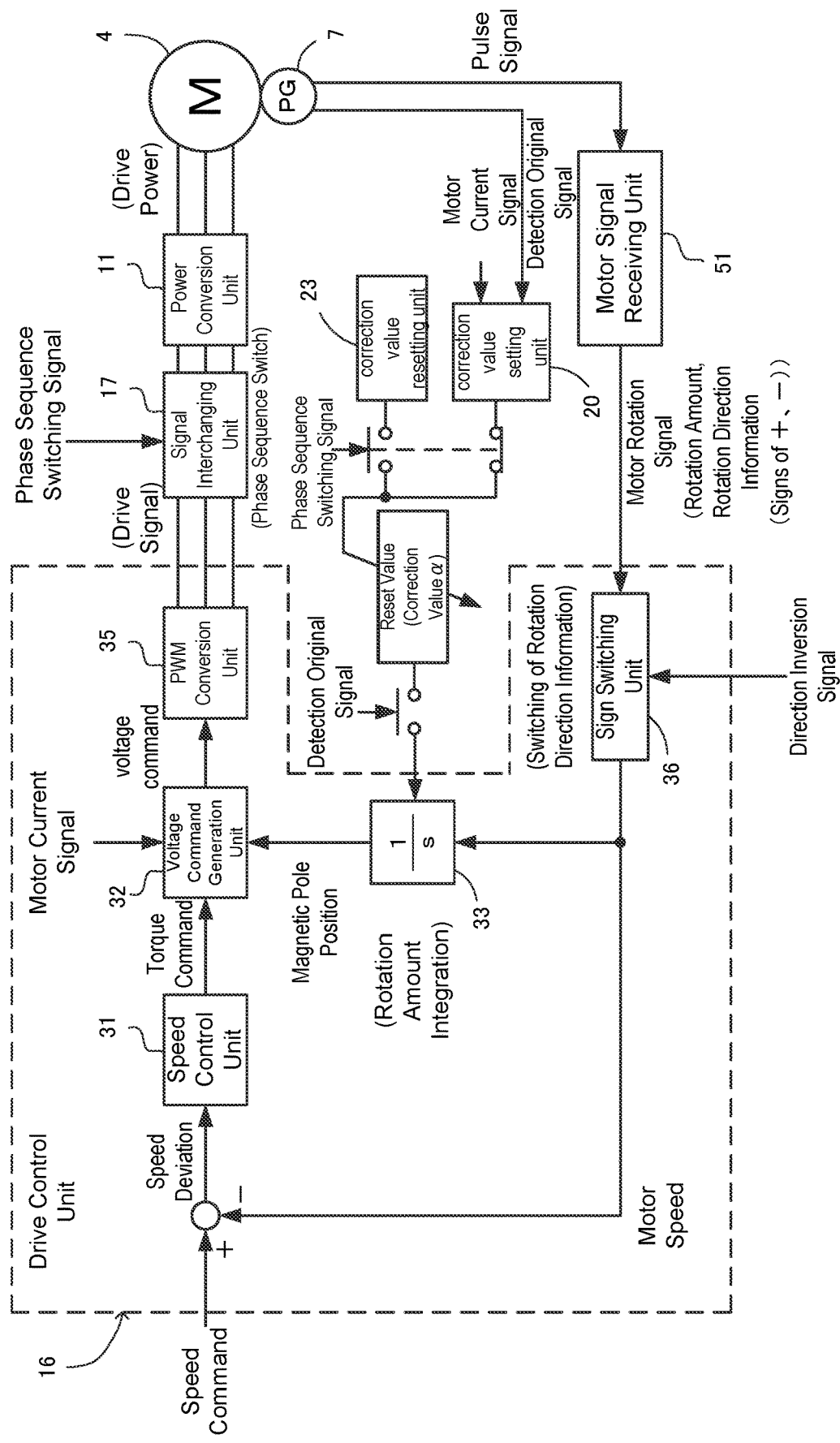
FIG. 4 is a diagram showing an example of a feedback loop processed by the drive control unit.

Next, referring to FIG. 4 of a feedback loop, the internal processing of the drive control unit 16 will be described. The feedback loop shown in FIG. 4 represents the control processing executed by the drive control unit 16 in the form of a transfer function. In the example of the present embodiment, as described above, it is assumed that the drive control unit 16 performs the speed control based on the speed command output by the host controller 2, and the corresponding loop processing of the speed control as shown in the drawing is executed. In FIG. 4, each of the PWM conversion unit 35, the signal interchanging unit 17, the power conversion unit 11, the motor signal receiving unit 51, the correction value setting unit 20, and the correction value resetting unit 23 does not execute processing described in a transfer function format, but is described as a reference for facilitating understanding of the function of the feedback loop control.

In this loop process, a deviation between the speed command input from the host controller 2 and the motor speed detected from the encoder 7 is obtained as a speed deviation, and the speed control unit 31 generates a torque command based on this speed deviation. Further, the voltage command generation unit 32 generates a voltage command signal based on the torque command, the magnetic pole position signal detected by the encoder 7, and the motor current signal detected by the current sensor 13. The motor 4 is driven by supplying drive power corresponding to the torque command and the speed command. In the above description, it is assumed that the power conversion unit 11 is a voltage type, but in the case of a current type, the voltage command generation unit 32 serves as a current command generation unit and generates a current command signal. When the motor 4 is an induction type motor or a DC motor, the magnetic pole position signal is not necessary for generating the voltage command signal.

In the example shown in FIG. 4, the encoder 7 is a pulse generator that generates a pulse signal in accordance with the rotation of the motor 4, and the motor signal receiving unit 51 outputs the motor rotation signal including the rotation amount and rotation direction information of the motor 4 based on the pulse signal. The processing contents of the motor signal receiving unit 51 will be described in detail later. As described above, the motor rotation signal output from the encoder 7 includes information on the rotation amount and the rotation direction of the motor 4. In this example, the rotation amount is detected as an absolute value for each system cycle of the drive control unit 16, and the rotation direction is detected as a positive or negative sign given to the absolute value.

Then, the motor speed is calculated with signed rotation amount of the motor rotation signal. If the rotation amount detected by the encoder 7 can be repeatedly measured within a certain period of time, the motor rotation signal directly becomes the motor speed. If the rotation amount detected by the encoder 7 is the rotation angle of the motor 4, the motor speed is obtained by differentiating the motor rotation signal. Further, when the motor 4 is a synchronous motor, the motor speed is subjected to first-order time integration by an integration operator 33 to calculate the magnetic pole position signal.

The PWM conversion unit 35 included in the drive control unit 16 generates a switch drive signal for driving semiconductor switching elements of the inverter bridge 11c (omitted in FIG. 4, see FIG. 2) of the power conversion unit 11 based on the duty ratio corresponding to the three phase voltage amplitudes of the voltage command signal calculated as described above and the three-phase sequence. Then, the signal interchanging unit 17 determines whether the signal interchanging unit 17 interchanges the phase sequence of the switch drive signals or not in accordance with the input of the phase sequence switching signal and updates the phase sequence in accordance with the determination. The power conversion unit 11 performs power conversion of the drive power based on the updated switch drive signals.

In addition, in the example of the present embodiment, the feedback loop includes the sign switching unit 36 that switches the positive and negative signs of the rotation direction information with respect to the motor rotation signal before being output and integrated by the motor signal receiving unit 51. The sign switching unit 36 is does not switch the positive and negative signs of the initial rotation direction information when the direction inversion signal is not input, and so as to switches the positive and negative signs of the rotation direction information as described later when the direction inversion signal is input.

When the stop control of the elevator car 6 to each floor position is performed using the speed control feedback loop in the drive control unit 16 of the motor control apparatus 3 as described above, the speed command is generated on the host controller 2 side so as to realize the stop control in consideration of the riding comfort of the passenger. That is, when accelerating from the movement start position of the elevator car 6, the elevator car 6 is accelerated with the speed reference drawing a so-called S-shaped speed curve up to a steady movement speed. Thereafter, when the motor position reaches a deceleration start position before the target stop position, the speed is smoothly reduced to a so-called creep speed tracing the S-shaped speed curve, and when the motor position reaches the target stop position, the elevator car 6 is stopped in conjunction with a brake (not shown). As described above, the host controller 2 refers to the motor position input from the motor control apparatus 3 or the detected position of the elevator car 6 provided separately (both are not particularly shown), and sequentially changes and generates the speed command according to the position of the elevator car 6 based on the motor position or the detection position.

4: Trouble and its Countermeasure

When the motor drive mechanism such as the elevator drive system 100 described above is newly installed and wired at the construction site, the elevator car 6 may move in the direction opposite to the direction intended by the operator, or a protective function such as overcurrent or excessive speed may work, in the subsequent operation stage. As a result, a malfunction phenomenon may occur in which the motor 4 does not rotate and the elevator car 6 does not move. These troubles of malfunction phenomena are occurred largely because of maloperation related to the rotation direction of the motor 4. For example, as shown by a broken-line frame in FIG. 1, there are miswiring of a power supply line 24 for supplying drive power from the motor control apparatus 3 to the motor 4, an error setting inside of the motor control apparatus 3, miswiring of the encoder 7, misconnection in the wrong direction when the encoder 7 connects to the motor 4, and installation in the wrong direction of the motor 4 itself. The cause of the trouble may be due to only one of these errors, or may be due to a plurality of errors occurring in combination. When such a trouble occurs, it takes extra labor and costs to specify all detailed causes of which error is caused at the construction site and to take measures for the specified causes, and that often becomes an obstacle to quick start-up of equipment.

When any one of or a combination of the above-described various errors in installation and wiring occurs, two types of troubles occur, that is, the elevator car 6 moves in the direction opposite to the intended direction or the elevator car 6 stops immediately. Hereinafter, the former is referred to as protection stop trouble, and the latter is referred to as opposite-direction rotation trouble.

As will be described in detail later, in response to the occurrence of the protection stop trouble, the protection stop trouble can be eliminated and normal operation can be achieved by performing rotation direction adjusting process in which the rotation direction corresponding to the predetermined phase sequence with respect to the motor 4 when outputting the switch drive signal is matched to the rotation direction corresponding to the rotation direction information included in the motor rotation signal. Further, for the occurrence of the opposite-direction rotation trouble, the opposite-direction rotation trouble can be eliminated by performing the rotation direction reversing process for reversing the rotation direction of the motor 4 with respect to the drive command signal, and motor 4 can be operated normally.

Therefore, in the present embodiment, as shown in FIG. 1, when the elevator drive system 100 is operated, if the operator recognizes presence or absence of the two types of troubles as described above and the types thereof, the presence of the trouble and the types thereof are input to the operation unit 15 of the motor control apparatus 3 shown in FIG. 2. Thus, the motor control apparatus 3 which recognizes the presence of the trouble of the motor 4 selectively executes the rotational direction adjusting process and the rotation direction reversing process corresponding to the kind of the trouble, thereby eliminating both kinds of troubles.

Specific input operations from the operator regarding the presence and type of the trouble are as follows. First, an operator who has recognized a trouble operates the operation unit 15 in accordance with a predetermined menu order, whereby the display screen on the display unit 14 is changed to a setting screen for troubleshooting as shown in FIG. 5A, for example. Then, the operator selects an item corresponding to the type of the trouble whose presence has been recognized, and after the selection, the screen shifts to the trouble shooting screen shown in FIG. 5B to input the final determination about the execution of the troubleshooting. In the illustrated example, on the selection setting screen of FIG. 5A, an item "stop without starting" corresponding to the protection stop trouble and an item "rotation direction is different" corresponding to the opposite direction rotation trouble are displayed, and the item "stop without starting" is selected. In the example of the present embodiment, when the item "stop without starting" is selected, the first trouble signal is output, and when the item "rotation direction is different" is selected, the second trouble signal is output. In the example of the present embodiment, when the operator confirms the presence or absence of the energization current to the motor 4, the current value of the motor current signal detected by the current sensor 13 may be confirmed on a separate display screen (not shown) of the display unit 14. Alternatively, by displaying the failure signal held by the integrated control unit 12 on the display screen of the display unit 14, the operator can confirm whether any of the protection functions has been activated.

As described above, even if the operator himself/herself does not correctly specify and correct the installation or connection error occurring in the elevator drive system 100 at that time, the motor control apparatus 3 can automatically eliminate the trouble of the motor 4 (the trouble of the elevator drive system 100) and operate the elevator drive system 100 normally.

In addition, in the example of the present embodiment, for convenience of description, the rotation direction of the motor 4 is defined as follows. That is, when the value of the speed command in the drive control unit 16 (see FIG. 4) is a positive value (+value), the motor 4 is driven in the "forward rotation direction", and when the value of the speed command is a negative value (−value), the motor 4 is driven in the "reverse rotation direction". In addition, in terms of control of the motor 4, a rotation direction intended by an operator is referred to as a "normal rotation direction", and such rotation driving is referred to as "normal direction rotation". On the other hand, a direction opposite to the rotation direction intended by the operator is referred to as an "opposite rotation direction", and such driving is referred to as "opposite direction rotation". The above-described correspondence relationship between the positive value and the negative value of the command value with respect to the rotation direction is merely an example, and is not limited thereto.

Hereinafter, specific methods for dealing with the protection stop trouble and the opposite direction rotation trouble will be described in detail.

5: Countermeasure Against Protection Stop Trouble

As described above, when the protection stop trouble occurs, the actual rotation direction of the motor 4 and the rotation direction of the motor 4 detected by the encoder 7 are opposite to each other when the motor 4 and the encoder 7 are coupled to each other, an equivalent miswiring state of the encoder 7, or miswiring of the motor main circuit may be considered as a possible factor. In this case, in the feedback loop control as shown in FIG. 4, since the sign of the motor speed input to the drive control unit 16 continues to be opposite to the instructed rotation direction (for example, a negative value when the forward rotation is instructed), the absolute value of the calculated speed deviation becomes excessively large (see FIG. 4), and as a result, the motor control apparatus 3 stops the rotation of the motor 4 by a protection function, resulting in a protection stop trouble. That is, the protection function works against the occurrence of an excessive current flowing through the motor 4 or the motor 4 rotating at an excessive speed, and the rotation of the motor 4 stops.

Therefore, in the present embodiment, when the first trouble signal indicating that the protection stop has occurred is input by the input operation from the user via the operation unit 15, the trouble handling unit 19 outputs the phase sequence switching signal instructing to interchange the phase sequence with respect to the original three-phase sequence (in this example, the UVW phase sequence) for the motor 4. Thus, the direction of rotation of the motor 4 can be made to coincide with the direction of rotation of the motor 4 detected by the encoder 7. That is, in the feedback loop of FIG. 4 where the direction indicated by the sign of the speed command and the motor speed is reversed, the direction in which the motor 4 is going to rotate is reversed and is matched with the phase sequence in which the voltage command signal determined from the speed command is output by the signal interchanging unit 17. This makes it possible to match the directions indicated by the sign of the speed command with sign of the motor speed. As a result, the normality of the control function (normality of the speed deviation) in the entire feedback loop can be ensured.

In this way, the drive control unit 16 outputs the switch drive signal in accordance with the phase sequence after the interchange processing is performed, and thus the motor control apparatus 3 can quickly solve the protection stop trouble by its own processing. In this case, it is possible to ensure the normality of the control function only by performing the phase sequence interchange process, and it is not necessary to reverse the sign of the rotation direction.

On the other hand, when the first trouble signal indicating that the protection stop trouble has occurred is input by an input operation from the user via the operation unit 15, the protection stop trouble can be solved by reversing the sign of the rotation direction. To be more specific, in the feedback loop control shown in FIG. 4, the direction inversion signal is input to the sign switching unit 36 in order to invert the rotation direction information (positive or negative sign) of the motor rotation signal. In this way, it is possible to directly correct the relationship in which the sign of the speed command and the sign of the motor speed are opposite to each other, and it is also possible to ensure the normality of the control function (the normality of the speed deviation) in the entire feedback loop. In this case, the normality of the control function can be ensured only by reversing the sign of the rotation direction, and it is not necessary to interchange the phase sequence.

6: Countermeasure Against Opposite Direction Rotation Trouble

Further, as described above, when the opposite direction rotation trouble occurs in which the motor 4 rotates in the direction opposite to the direction corresponding to the original three-phase sequence (UVW phase sequence) (that is, the direction intended by the operator or the direction corresponding to the sign of the speed command), a possible factor is miswiring in the encoder 7 or both miscoupling and miswiring of the motor 4. In addition, an error in the installation direction of the motor 4, specifically, an error in the installation direction of the motor 4 along with the axial direction when the motor 4 is coupled to the lifting mechanism 5 is also considered as a factor. That is, although the control itself of the motor control apparatus 3 is normally performed and the motor 4 rotates normally, the correspondence relationship between the rotation direction and the forward rotation/reverse rotation direction of the machine driven by the motor 4 is opposite to the initially expected relationship. For example, in the elevator drive system 100 shown in FIG. 1, the elevator car 6 descends when the operator performs an ascending operation by the operation panel 1, and the elevator car 6 ascends when the operator performs a descending operation.

Therefore, in the present embodiment, when the second trouble signal indicating that the opposite direction rotation trouble has occurred is input by the input operation from the user via the operation unit 15, the trouble handling unit 19 outputs the phase sequence switching signal instructing to interchange the phase sequence with respect to the original three-phase sequence (the UVW phase sequence in this example) for the motor 4. Furthermore, the drive control unit 16 controls the drive of the motor 4 based on the rotation direction opposite to the rotation direction information of the motor rotation signal. To be more specific, in the feedback loop control shown in FIG. 4, the direction inversion signal is input to the sign switching unit 36 to invert the rotation direction information (positive or negative sign) of the motor rotation signal. As described above, the correspondence relationship between the forward rotation/reverse rotation direction of the machine and the forward rotation/reverse rotation direction of the motor 4 is reversed, and for example, in the elevator drive system 100 shown in FIG. 1, the elevator car 6 moves in the direction intended by the operator.

In this way, the drive control unit 16 outputs the switch drive signal based on the phase sequence after the interchange process and the motor rotation signal in which the rotation direction information is inverted, and thus the motor control apparatus 3 can quickly solve the opposite direction rotation trouble by its own process. The original phase sequence (the phase sequence of the UVW in this example) before the phase sequence is interchanged corresponds to the predetermined phase sequence described in each claim.

7: Phase Sequence Interchanging by the Signal Interchanging Unit

As described above, in the example of the present embodiment, the motor 4 can be rotated in the reverse direction by the signal interchanging unit 17 interchanging the phase sequence when the drive control unit 16 generates the switch drive signal based on the voltage command signal output to the inverter bridge 11c. FIG. 6 shows a signal interchange table indicating a correspondence relationship between switch drive signals input to the signal interchanging unit 17 shown in FIG. 2 and switch drive signals output therefrom. As shown in FIG. 6, the signal interchanging unit 17 receives six switch drive signals U1, U2, V1, V2, W1, and W2 from the drive control unit 16, and distributes and outputs the received switch drive signals to the six semiconductor switching elements QUu, QUd, QVu, QVd, QWu, and QWd included in the inverter bridge 11c. As shown in FIG. 6, the correspondence relationship of the distribution is switched depending on whether or not the phase sequence switching signal is input from the trouble handling unit 19. In the example of the present embodiment, a case will be described in which the original phase sequence is the UVW phase sequence, and the phase sequence of the U-phase and the W-phase is switched to the WVU phase sequence.

In FIG. 6, when there is no input of the phase sequence switching signal, the switch drive signals U1, U2, V1, V2, W1, and W2 input from the drive control unit 16 are distributed in correspondence with the original phase sequence of UVW and output to the inverter bridge 11c. To be more specific, the switch drive signals are distributed and output to the upper semiconductor switching elements QUu, QVu, and QWu and the lower semiconductor switching elements QUd, QVd, and QWd provided corresponding to the U-phase, the V-phase, and the W-phase in the inverter bridge 11c in the correspondence relationship of U1→QUu, U2→QUd, V1→QVu, V2 QVd, W1→QWu, and W2→QWd.

On the other hand, when the phase sequence switching signal is input, each of the switch drive signals U1, U2, V1, V2, W1, and W2 input from the drive control unit 16 are distributed according to the correspondence relationship in the phase sequence of the WVU and output to the inverter bridge 11c. To be more specific, the drive signals are distributed and output according to the correspondence relationship of U1→QWu, U2→QWd, V1→QVu, V2→QVd, W1→QUu, W2 QUd.

In addition to the above, a component corresponding to the signal interchanging unit 17 may be provided on the input side of the PWM control unit 35. In this case, at the voltage phase θ at an arbitrary point in time, the distribution method is changed. The distribution method determines the phase to which each of the three-phase voltage commands having a phase difference of 120 degrees from each other of V sin θ, V sin (θ-120°), V sin (θ-240°) output from the voltage command generation unit 32 is distributed. For example, when there is no input of the phase sequence switching signal.

U-phase: V sin θ, V-phase: V sin (θ-120°), W-phase: V sin (θ-240°), the three-phase voltage commands are distributed to the respective output phases. On the other hand, when the phase sequence switching signal is input, the three-phase voltage command is distributed as W-phase: V sin θ, V-phase: V sin (θ-120°), U-phase: V sin (θ-240°) to the respective output phases and output to the PWM conversion unit 35.

In this way, the signal interchanging unit switches the signal phase sequence of each drive signal between UVW and WVU depending on whether or not the phase sequence switching signal is input, and thus it is possible to switch the rotation direction of the motor 4 between the forward rotation direction and the reverse rotation direction while maintaining the drive command signal generated by the drive control unit 16. Although not particularly illustrated, the rotation direction of the motor 4 can be similarly reversed in any of the case of the phase sequence of VUW in which the phase sequence of the U-phase and the V-phase is interchanged with respect to the original phase sequence of UVW and the case of the phase sequence of UWV in which the phase sequence of the V-phase and the W-phase is interchanged.

8: Generation and Processing of a Pulse Signal in the Encoder

The processing in the motor signal receiving unit 51 will be described with reference to FIGS. 7A and 7B. When the encoder 7 is of an incremental type, a plurality of slits or reflecting plates are arranged at predetermined intervals in the circumferential direction of a disk fixed to the output shaft of the motor 4, and projection light from a light projecting portion fixed to the stator is transmitted through the slits or reflected by the reflecting plates, and a light receiving portion fixed to the stator receives the transmitted light or the reflected light, thereby generating a periodic pulse signal (not particularly shown). The motor signal receiving unit 51 counts the pulses of the pulse signal to detect the rotation amount of the motor 4. Further, the rotation direction of the motor 4 can be detected by providing two sets of the light projecting unit and the light receiving unit for the A-phase and the B-phase in the phase arrangement shifted by 90° corresponding to multiple times of the spacing between the slits or the reflection plates and detecting the phase lead relationship between two pulse signals generated in each phase by the motor signal receiving unit 51.

Figure 7:
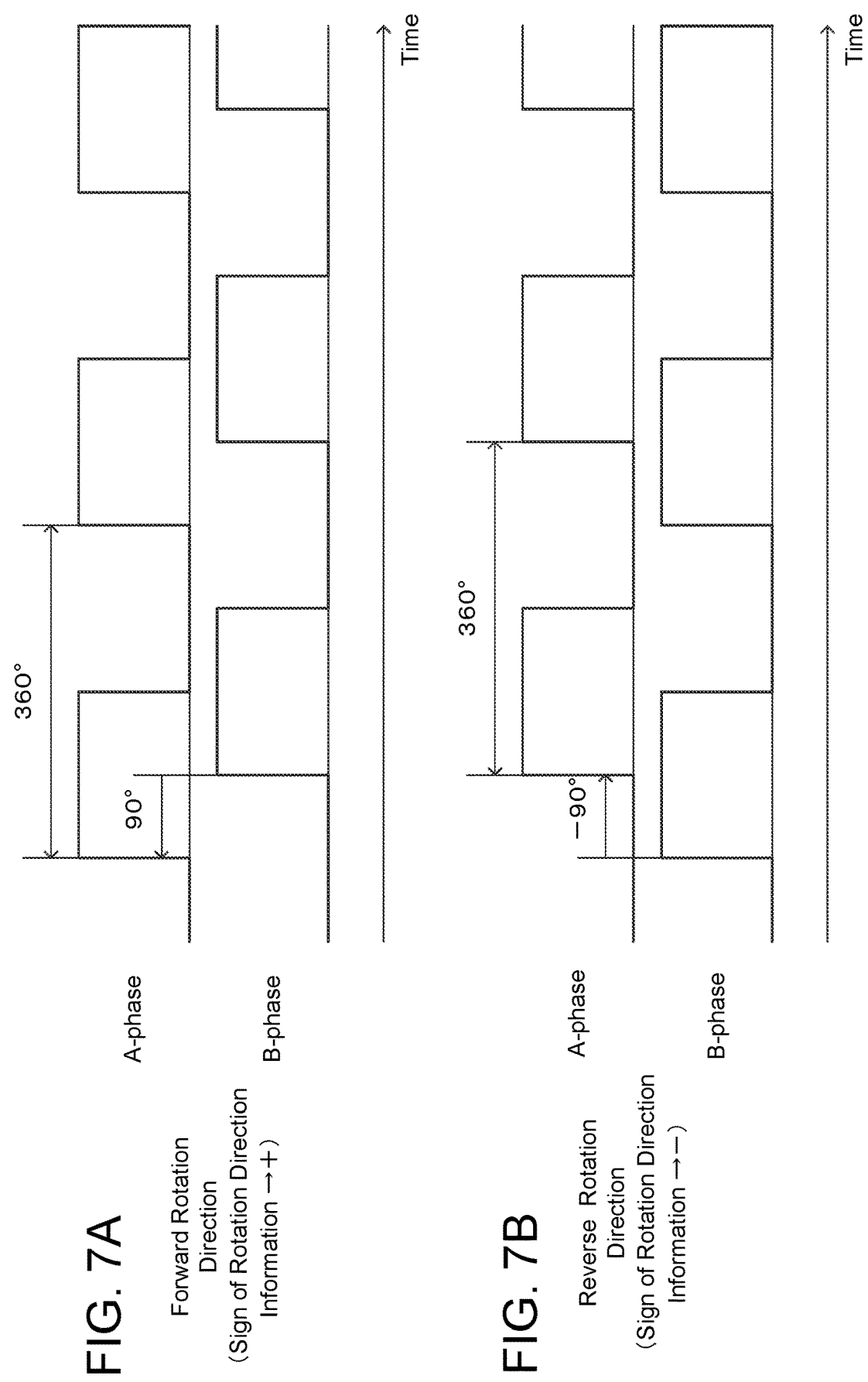
FIGS. 7A and 7B are diagrams showing a setting example of the correspondence between the phase difference between the A-phase and B-phase pulse signals and the sign representing the rotation direction information.

In the example of the present embodiments for detecting the rotation direction, as shown in FIG. 7A, when the A-phase pulse signal is advanced with respect to the B-phase pulse signal, it is to be set as forward rotation direction (the sign of the rotation direction information is set to "+"), and as shown in FIG. 7B, when the A-phase pulse signal is delayed with respect to the B-phase pulse signal, it is to be set as the reverse rotation direction (the sign of the rotation direction information is set to "−" in this example). Based on the setting of the first condition, the motor signal receiving unit 51 detects the phase lead relationship between the two pulse signals of the A-phase and the B-phase, and thus the rotation direction information (sign information of either "+" or "−") of the motor 4 can be output.

Further, contrary to the above-described first condition although not shown in the drawings, when the second condition is able to set. In the second condition, when the A-phase pulse signal is advanced with respect to the B-phase pulse signal, it is to be set as the reverse rotation direction (the sign of the rotation direction information is "−" in this example), and when the A-phase pulse signal is delayed with respect to the B-phase pulse signal, it is to be set as the forward rotation direction (the sign of the rotation direction information is "+" in this example). When the condition is switched between the first condition and the second condition, the output rotation direction information is turned over.

Therefore, in the example of the present embodiment, switching of the setting of the first condition and the second condition described above is realized by interchanging the positive and negative signs of the rotation direction information depending on whether or not the direction inversion signal is input to the sign switching unit 36.

9: Internal Processing of Trouble Handling Unit

Figure 8:
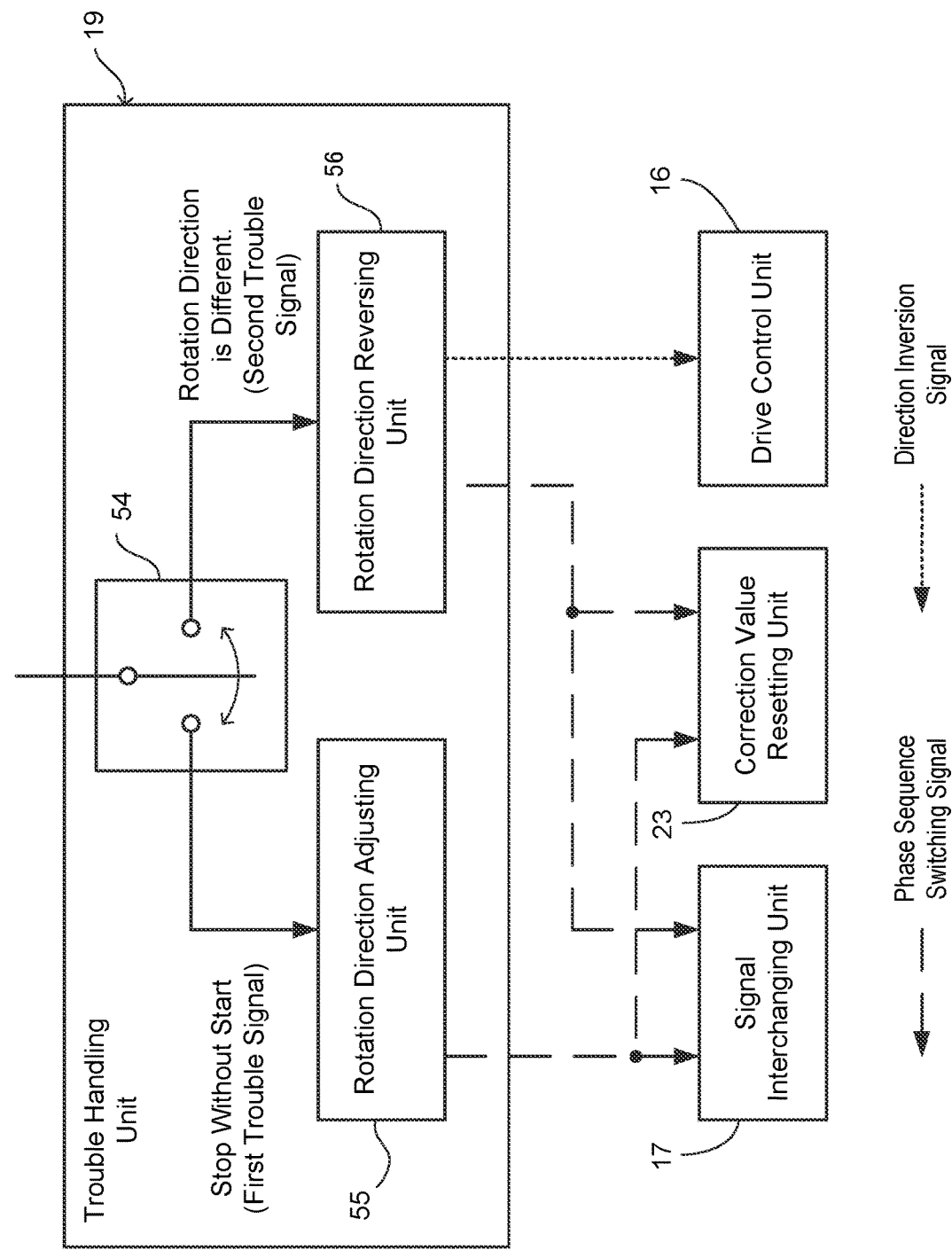
FIG. 8 is a diagram showing an example of the block configuration of the trouble handling unit.

The internal processing of the trouble handling unit 19 will be described with reference to the block diagram shown in FIG. 8. In FIG. 8, the trouble handling unit 19 includes a trouble signal identification unit 54, a rotational direction adjusting unit 55, and a rotation direction reversing unit 56.

The trouble signal identification unit 54 switches the output destination of the trouble signal according to whether the type of the trouble signal input via the trouble signal receiving unit 18 is the first trouble signal or the second trouble signal on the selection setting screen of the operation unit 15 (indicated by the symbol of the selection switch in the drawing). In the example of the present embodiment, when the item corresponding to the occurrence of the protection stop trouble is selected by the operation unit 15 and the first trouble signal is input, the trouble signal is input to the rotation direction adjusting unit (rotation direction adjusting circuitry) 55 described later. On the other hand, when the item corresponding to the occurrence of the opposite direction rotation trouble is selected by the operation unit 15 and the second trouble signal is input, the trouble signal is input to the rotation direction reversing unit 56 described later.

When the first trouble signal is input, the rotation direction adjusting unit 55 operates to output the phase sequence switching signal to each of the signal interchanging unit 17 and the correction value resetting unit 23. That is, the rotation direction adjusting unit 55 performs the rotation direction adjusting process in which the phase sequence for the motor 4 when the drive control unit 16 outputs the drive signal matches the rotation direction information included in the motor rotation signal by interchanging the phase sequence for the motor 4. Although not particularly illustrated, the rotation direction adjusting unit 55 may operate to output a direction inversion signal to the sign switching unit 36 of the drive control unit 16. That is, in this case, the rotation direction reversing unit 56 in this case performs the rotation direction adjusting process by reversing the rotation direction information included in the motor rotation signal. When the motor 4 is not a synchronous motor, the correction value resetting unit 23 is not provided, and thus it is not necessary to output the phase sequence switching signal to the correction value resetting unit 23.

When the second trouble signal S2 is input, the rotation direction reversing unit 56 outputs the phase sequence switching signal to the signal interchanging unit 17 and the correction value resetting unit 23 respectively, and outputs a direction reversing signal to the sign switching unit 36 of the drive control unit 16. That is, the rotation direction reversing unit 56 performs rotation direction reversing process for inverting the rotation direction of the motor with respect to the drive signal by performing both inversion of the rotation direction information included in the motor rotation signal and switching of the phase sequence with respect to the motor 4. Similarly to the rotation direction adjusting unit 55, when the motor 4 is not a synchronous motor, it is not necessary to output the phase sequence switching signal to the correction value resetting unit 23.

As described above, the trouble handling unit 19 in the example of the present embodiment selectively executes one of the rotation direction adjusting process by the rotation direction adjusting unit 55 and the rotation direction reversing process by the rotation direction reversing unit 56 according to the type of the input trouble signal.

10: Correction of Encoder

As described above, in the example of the present embodiment, the motor 4 to be controlled by the motor control apparatus 3 is a synchronous motor, but in such a case, the magnetic pole position of the synchronous motor needs to be detected by the encoder 7 regardless of whether the encoder 7 is a so-called incremental type or an absolute value type. For this reason, accuracy of the magnetic pole position may be improved by correcting the detection position of the magnetic pole position using the magnetic pole position when the detection origin signal (for example, the Z-phase pulse) of the rotation position to be detected once is input when the rotor mechanically rotates once.

Here, for example, as shown in FIGS. 9A, 9B, and 9C, the Z-phase light receiving portion related to the detection origin of the encoder 7 exists in a fixed portion which does not relate to the rotation of the motor rotation axis to which the encoder 7 is attached. Therefore, the positional relationship between the position 41 of the Z-phase light receiving portion and the reference phase winding position (the U-phase winding position in this example) in the stator is constant regardless of the rotation of the motor rotation axis. The Z-phase marker portion (slit or reflection plate) related to the detection origin of the encoder 7 exists in the rotation portion of the encoder 7. Therefore, the positional relationship between the position 42 of the Z-phase marker portion and the magnetic pole position P (position in the d-axis direction) of the rotor including the permanent magnet is constant regardless of the rotation of the motor rotation axis. Therefore, when the Z-phase light receiving portion and the Z-phase marker portion face each other and the detection origin signal is input, the magnetic pole position with respect to the U-phase winding is unchanged.

As described above, the magnetic pole position signal $\theta$ based on the motor rotation signal detected by the encoder 7 is corrected to reflect the unchanged magnetic pole position every time the detection origin signal is input, thereby improving the accuracy of the vector control processing of the synchronous motor based on the magnetic pole position signal.

Therefore, in the example of the present embodiment, when adjusting the elevator drive system 100, the correction value setting unit 20 sets the correction value a for the rotational position of the motor 4 reflecting the unchanged magnetic pole position. During operation of the elevator drive system 100, the magnetic pole position signal $\theta$ is corrected by the correction value a and used, thereby improving the control accuracy of vector control in the drive control unit 16.

Specifically, for the setting of the correction value a, first, the drive control unit 16 determines an initial magnetic pole position before activation by static tuning by a known initial magnetic pole estimation (for example, magnetic pole position detection by high frequency superposition with the brake closed) operation. This magnetic pole position is obtained as an angle with respect to a reference phase (for example, U-phase) winding position, for example. Thereafter, the motor is started, and when the encoder 7 is an incremental type, the drive control unit 16 calculates the magnetic pole position signal $\theta$ by integrating the motor rotation signal detected by the encoder 7 with the initial magnetic pole position as an initial value. The magnetic pole position signal $\theta$ corresponds to, for example, an electrical angle with respect to a reference phase (for example, a U-phase), and is calculated as a sawtooth wave signal that is reset to 0 every electrical angle of 360° using the number of pulses per rotation and the number of pole pairs of the motor. When the encoder 7 is of an absolute value type, the magnetic pole position signal $\theta$ having a sawtooth waveform can be immediately obtained by directly reading the output signal of the encoder.

When the encoder 7 is an incremental type, the correction value setting unit 20 observes the detection origin signal for a predetermined period and detects the magnetic pole position signal $\theta$ when the detection origin signal is input. The magnetic pole position signal $\theta$ thus detected is stored as a correction value a. Thereafter, the drive control unit 16 corrects the magnetic pole position signal $\theta$ by replacing the magnetic pole position signal $\theta$ with the stored correction value a every time the detection origin signal is input. The predetermined period may be set as, for example, a predetermined period after the motor 4 is started. Alternatively, a predetermined number of rotations after the motor is started may be set as a predetermined period, the value of the magnetic pole position signal $\theta$ may be sampled every time the detection origin signal at the period is input, and these values may be averaged to obtain a correction value.

However, even if the correction value a is set at the time of adjustment of the elevator drive system 100 as described above, when the protection stop trouble occurs at the time of subsequent operation, the direction in which the motor 4 rotates and the rotation direction of the motor 4 detected by the encoder 7 do not coincide with each other, and thus the magnetic pole position signal $\theta$ deviates from the actual magnetic pole position. In this case, the initial magnetic pole position estimation is performed again, and then the operation is performed, whereby the correction value setting unit 20 sets the value of the correction value a to a correct value, and the deviation is eliminated.

Further, when the protection stop trouble or the opposite direction rotation trouble is recognized during the operation and the phase sequence replacement processing is performed, it is necessary to reset the correction value a according to the processing content of the replacement processing. If the correction value setting unit 20 sets the correction value a by monitoring the detection origin signal at a predetermined time after the start of the operation as described above, this resetting is automatically performed by the operation, and no problem occurs. However, if the setting of the correction value a is not performed every time after the start of the operation, it is necessary to reset the correction value a.

A correction value resetting unit 23 is provided for resetting. The correction value resetting unit 23 can be configured to obtain the correction value a after the phase sequence switching by calculation. When the U-phase, which is the reference phase of the magnetic pole position signal $\theta$, is not used for interchanging the phase sequence in the phase sequence interchanging process, for example, when the phase sequence of the V-phase and the W-phase is interchanged, the correction value resetting unit 23 can correct the magnetic pole position signal $\theta$, which is the magnetic pole position with respect to the reference phase position, only by inverting the positive and negative signs thereof as illustrated in FIG. 10A.

In addition, when the U-phase, which is the reference phase of the magnetic pole position, is used for interchanging the phase sequence in the phase sequence interchanging process, it is necessary to consider the phase difference between the U-phase and the phase to be interchanged in addition to simply inverting the sign. For example, when the phase sequence of the U-phase and the V-phase is switched, as illustrated in FIG. 10B, the correction value resetting unit 23 resets the correction value a corresponding to the new electrical angle position of the U-phase as 120°−α which is the sum of the phase difference 120° between the U-phase and the V-phase and −α obtained by changing the sign of the correction value a before the phase sequence switching. Similarly, when the phase sequence of the U-phase and the W-phase is interchanged, the correction value resetting unit 23 resets the correction value a as 240°−α as illustrated in FIG. 10C. All the angles described in the above description are electrical angles.

As described above, the correction value resetting unit 23 calculates and resets the correction value a in accordance with the phase sequence interchanging process. The correction value resetting unit 23 may be configured to activate the motor 4 and cause the correction value setting unit 20 to execute the setting of the correction value a, or to activate the motor 4 and perform the same operation as the correction value setting unit 20 to set the correction value a, for example, by the operation of the operation unit 15.

11: Control Flow

Figure 11:
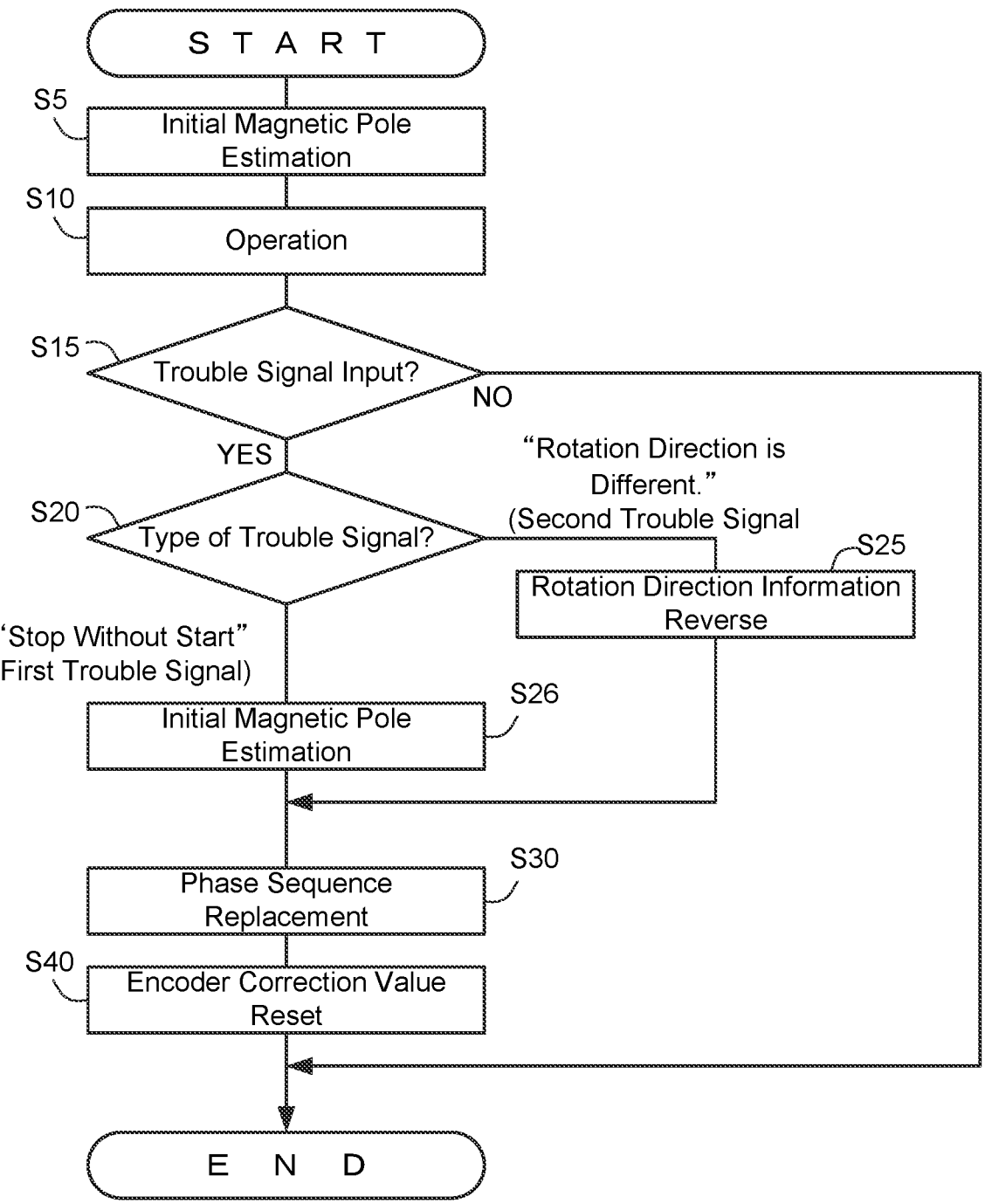
FIG. 11 is a flowchart showing an example of a control procedure of processing executed by the CPU of the motor control apparatus in the embodiment.

FIG. 11 shows a flowchart of a control procedure executed by the CPU of the motor control apparatus 3 in order to realize the method of coping with the trouble described above.

First, in step S5, the CPU of the motor control apparatus 3 detects an initial magnetic pole position of the motor 4 in a motor stop state. If the motor 4 is a motor other than the synchronous motor, the step S5 is not executed.

Next, the process proceeds to step S10, and the CPU of the motor control apparatus 3 performs operation based on the operation input. At this time, if the motor 4 is a synchronous motor, the magnetic pole position signal θ is calculated based on the initial magnetic pole position and the motor rotation signal output from the motor signal receiving unit 51. Further, the detection origin signal is observed for a predetermined period, and when the detection origin signal is input, the value of the magnetic pole position signal θ at that time is determined as the correction value a. For example, the predetermined period is a predetermined time after the motor 4 is started.

When the operation of step 10 is completed, the process proceeds to step S15, and the CPU of the motor control apparatus 3 determines whether or not any trouble selection input has been performed by an operation input via the operation unit 15 during the operation of step 10, in other words, whether or not any trouble signal has been input. When the trouble signal is not input, the determination is not satisfied (S15: NO), and this flow ends.

On the other hand, when the trouble signal is input, the determination is satisfied (S15: YES), and the process proceeds to step S20.

In the step S20, the CPU of the motor control apparatus 3 determines which type of trouble signal, the first trouble signal or the second trouble signal, is input by the operation input in the step S15. When the second trouble signal corresponding to the opposite direction rotation trouble is input, the process proceeds to step S25.

In step S25, the CPU of the motor control apparatus 3 inputs a direction inversion signal to the sign switching unit 36 of the drive control unit 16 to invert the sign of the rotation direction information of the motor 4 detected by the encoder 7. Then, the process proceeds to step S30.

On the other hand, in the determination of step S20, when the first trouble signal corresponding to the occurrence of the protection stop trouble is input, the process directly proceeds to step S26. In step S26, initial magnetic pole estimation is performed. After the initial magnetic pole estimation is completed, the process proceeds to step S30. Although not illustrated, the process may move to step S25. In this case, after completion of step S25, the process proceeds to step 45.

In step S30, the CPU of the motor control apparatus 3 inputs the phase sequence switching signal to the signal interchanging unit, and performs the phase sequence switching of the drive signals of the U-phase and the W-phase in the example of the present embodiment. It is to be noted that the execution of either the step S25 or the step S30 corresponds to the execution of the rotational direction adjusting process of the rotation direction adjusting unit 55, and the execution of the combination of both the step S25 and the step S30 corresponds to the execution of the rotational direction reversing process of the rotation direction reversing unit 56.

Next, the process proceeds to step S40, and the CPU of the motor control apparatus 3 uses the correction values a detected in the procedure of step S10 to reset the correction values a at this point after the phase sequence switching. The procedure of the step S40 corresponds to the correction value resetting unit 23 described above, and the correction value resetting unit 23 resets the correction values in accordance with the execution of the rotation-direction reversing process in the step S25 and the execution of the phase sequence replacement in the step S30. When the motor 4 is not a synchronous motor, step 40 is not performed. Even if the motor 4 is a synchronous motor, step 40 may not be performed if the correction value setting unit 20 sets the correction value a at the start of the subsequent operation. At the end of step 40, this flow ends.

12: Effect of Present Embodiment

As described above, in the elevator drive system 100 of the present embodiment, the operator can input what the content of the operation trouble is from the operation unit 15. Then, when the user inputs "an excessive current flows through the motor or the motor rotates at an excessive speed" to the operation unit 15, the corresponding first trouble signal is input from the operation unit 15 to the trouble signal receiving unit 18 of the motor control apparatus 3. Then, the rotation direction adjusting unit 55 of the trouble handling unit 19 performs a rotation direction adjusting process in which the phase sequence of the motor 4 during the drive signal is generated from the drive control unit 16 matches with the rotation direction information included in the motor rotation signal. This makes it possible to match the phase sequence for the motor 4 with the rotation direction information 101.

Thereafter, the drive control unit 16 outputs a drive signal based on the phase sequence and the motor rotation signal after the rotation direction adjusting process is performed as described above. As described above, the motor control apparatus 3 can quickly solve the aforementioned trouble related to the motor rotation by itself only by the operator performing the above-described operation input, for example, at the time of the test run. As a result, the operator can rotate the motor 4 forward/backward in a desired manner.

In the present embodiment, the encoder 7 outputs A-phase and B-phase pulse signals having phases different from each other by 90°. The rotation direction adjusting unit 55 inverts the rotation direction information by switching between the first condition and the second condition, where the first condition is that the A-phase pulse signal is ahead of the B-phase pulse signal in the forward rotation direction, and the A-phase pulse signal is delayed in the reverse rotation direction, where the second condition is that A-phase pulse signal is ahead of the B-phase pulse signal in the reverse rotation direction, and the A-phase pulse signal is delayed in the forward rotation direction. Thus, the predetermined phase sequence for the motor 4 and the rotation direction information can be easily matched by only internal processing in the motor control apparatus 3.

In addition, particularly in the present embodiment, the rotation direction adjusting unit 55 performs switching of the original phase sequence with respect to the motor 4 as the rotation direction adjusting process. Also in this case, it is possible to easily realize the matching of the predetermined phase sequence with respect to the motor 4 and the rotation direction information only by the internal processing in the motor control apparatus 3. In this manner, the rotation direction adjusting unit 55 may perform either inversion of the rotation direction information or exchange of the phase sequence as the rotation direction adjusting process.

Further, in the present embodiment, in particular, when the user inputs "the motor rotates in the direction opposite to the intended direction" to the operation unit 15, the corresponding second trouble signal is input from the operation unit 15 to the trouble signal receiving unit 18 of the motor control apparatus 3. Then, the rotation direction reversing unit 56 of the trouble handling unit 19 performs rotation direction reversing process for reversing the rotation direction of the motor 4 in response to the drive signal from the drive control unit 16. Thus, the actual rotational direction of the motor 4 can be reversed.

Thereafter, the drive control unit 16 generates a drive signal based on the phase sequence and the motor rotation signal after the rotation direction reversing process is performed as described above. Thus, the motor control apparatus 3 can quickly solve the above-described trouble related to the motor rotation by itself only by the operator performing the above-described operation input at the time of, for example, a test run. As a result, the operator can raise and lower the elevator car 6 in a desired manner, for example.

In addition, particularly in the present embodiment, the rotation direction reversing unit 56 performs inversion of the rotation direction information included in the motor rotation signal and replacement of the original phase sequence with respect to the motor 4 as the rotation direction reversing process. Thus, the rotation direction of the motor 4 can be easily reversed only by internal processing in the motor control apparatus 3.

In the present embodiment, in particular, when the motor 4 is a synchronous motor, the correction value resetting unit 23 performs predetermined setting processing on the correction value that is the magnetic pole position of the synchronous motor 4 at the time of input of the detection origin signal of the encoder 7 and that has already been set by the correction value setting unit 20. When the drive control unit 16 receives the first trouble signal and inverts the rotation direction information included in the motor rotation signal, or when the drive control unit 16 receives neither the first trouble signal nor the second trouble signal, the drive control unit 16 generates a drive signal according to the original phase sequence for the motor 4 based on the magnetic pole position signal θ, the motor rotation signal, and the correction values. When the drive control unit 16 receives the first trouble signal and performs phase sequence replacement, or when the drive control unit 16 receives the second trouble signal, the drive control unit 16 generates a drive signal based on the magnetic pole position signal θ, a correction value after performing the resetting process, the phase sequence after performing the rotational direction reversing process, and the motor rotation signal. Based on the above, the drive control unit 16 can perform highly accurate control regardless of whether the protection stop trouble or the opposite direction rotation trouble occurs.

Particularly in the present embodiment, when the magnetic pole position signal θ is set based on the phase replaced by the rotation direction reversing process, the correction value resetting unit 23 changes the correction values set by the correction value setting unit 20 based on the phase differences between the two phases replaced by the rotation direction reversing process and based on the correction value of which positive and negative signs are interchanged and when the detection origin of the encoder 7 is not set based on the phase replaced by the rotation direction reversing process, the correction value resetting unit 23 interchanges the positive and negative signs of the correction values set by the correction value setting unit 20. Thus, the correction value of the detection origin of the encoder 7, which has already been set by the correction value setting unit 20, can be appropriately changed in accordance with the change of the phase sequence.

Further, in the present embodiment, in particular, the power conversion unit 11 that includes the semiconductor switching element Q, converts DC power into AC power, and supplies the AC power to the motor 4 is further included, and the drive control unit 16 outputs an on/off signal of the semiconductor switching element Q based on the switch drive signal to control the semiconductor switching element Q. Thus, in the configuration in which the drive power supplied to the motor 4 is controlled by the power conversion unit 11 including the semiconductor switching element Q, it is possible to reliably execute the control corresponding to the inversion of the rotation direction information included in the motor rotation signal and the phase sequence interchange, and to reliably solve the above-described trouble related to the motor rotation.

In the above embodiment, the motor 4 to be controlled by the motor control apparatus 3 is a synchronous motor. In addition, even when the motor 4 is an induction motor or a direct current motor, it is possible to apply a countermeasure method by recognition of the presence of a trouble, inversion processing of the rotation direction information, and exchange processing of the phase sequence as in the above embodiment. In this case, since the magnetic pole signal θ and the compensation value a are unnecessary, the entire compensation value setting unit 20 and the procedure in the correction value resetting unit 23 in the step S40 in the flow of FIG. 11 can be omitted.

Further, in the above embodiment, both the protection stop trouble and the opposite direction rotation trouble are dealt with as the trouble, but the present invention is not limited thereto. For example, only one of the troubles may be dealt with.

13: Modification Example

An embodiment has been described in detail with reference to the accompanying drawings. However, the scope of the technical idea described in the claims is not limited to the embodiments described herein. It is apparent to those skilled in the art that various changes, modifications and combinations can be made without departing from the scope of the technical idea. Therefore, the technology after these changes, modifications, combinations, and the like are naturally included in the scope of the technical idea.

<13-1: When Only the Fact that a Trouble has Occurred is Input>

In the above embodiment, the operator selects and inputs the type of trouble via the operation unit 15. However, for example, when some trouble occurs with respect to the rotation direction of the motor 4, it is possible to automatically resolve the trouble by simply inputting information indicating that the trouble has occurred to the motor control apparatus 3 without the operator specifying the specific content or cause.

Figure 5B:
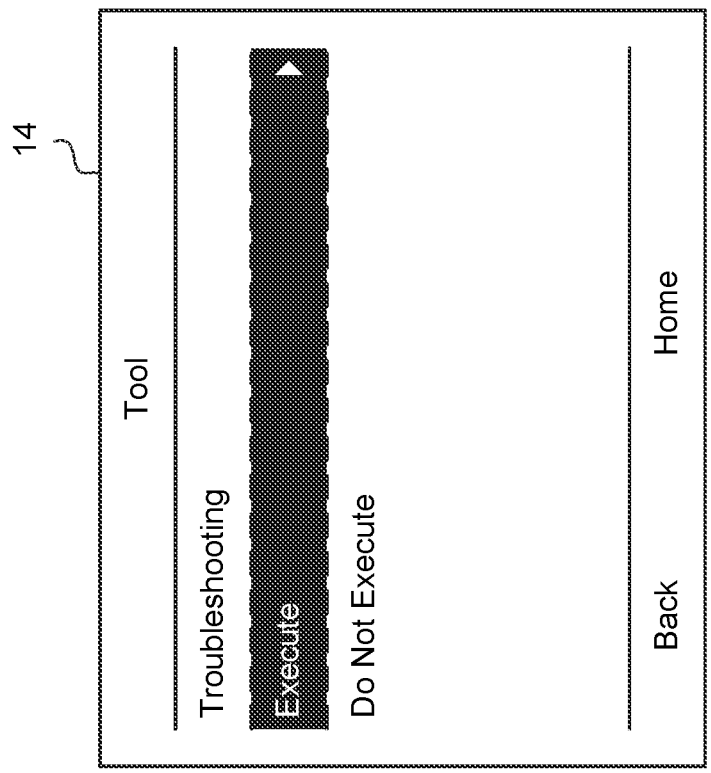
FIGS. 5A and 5B are diagrams showing an example of a trouble type selection screen and a troubleshooting trouble shooting screen on the display unit.
Figure 5A:
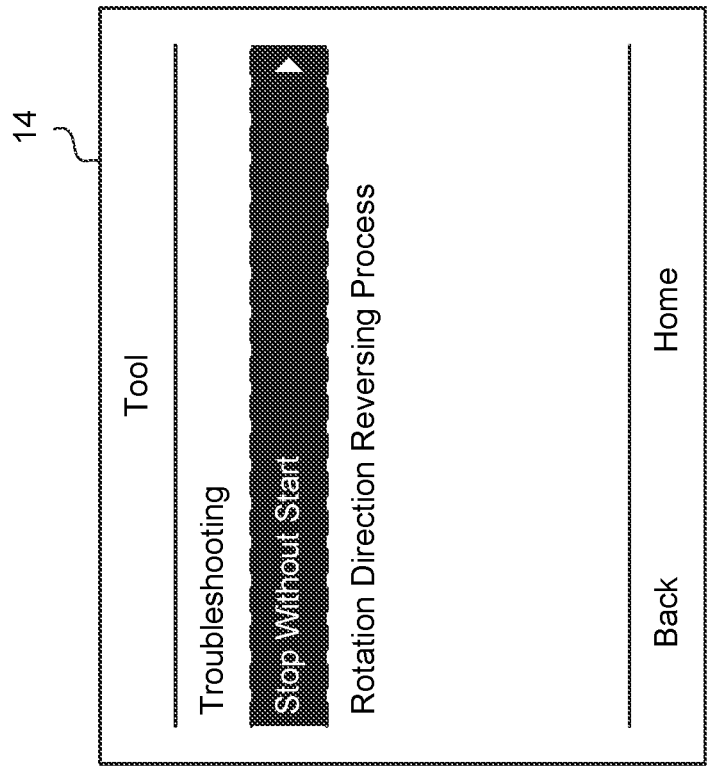
Figure 12B:
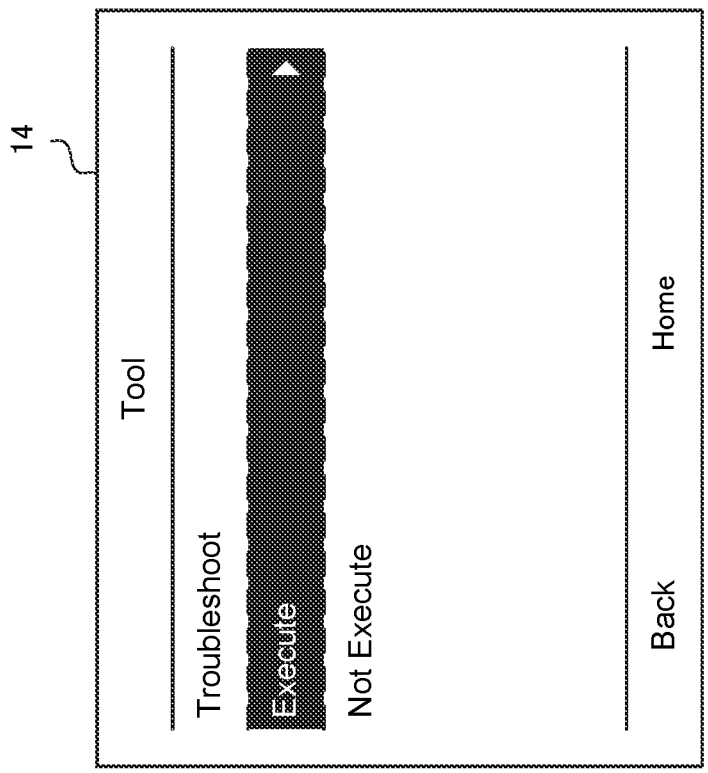
FIGS. 12A and 12B are diagrams showing an example of a selection screen for the presence or absence of a trouble and an trouble shooting screen on the display unit 14 in the case of inputting only the presence of a trouble.
Figure 12A:
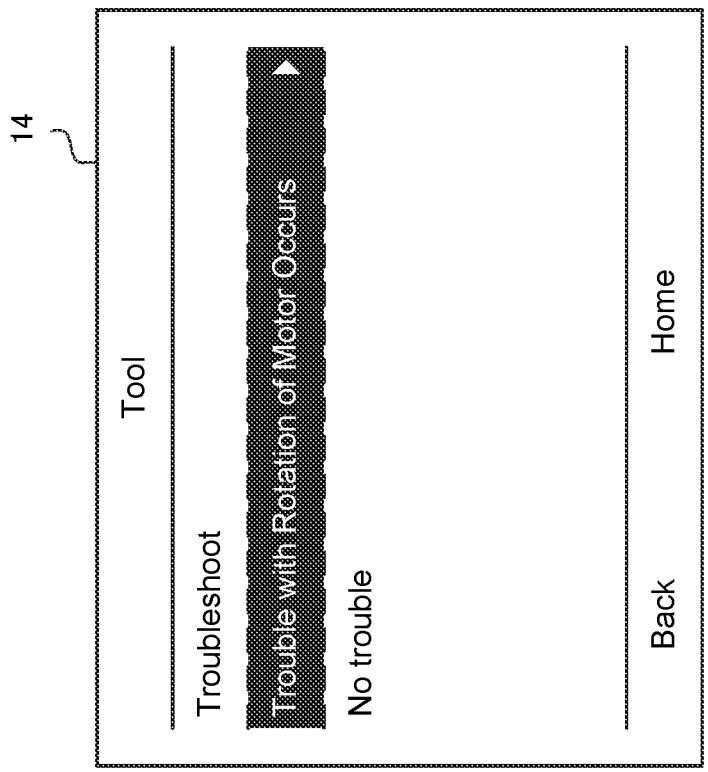

In this case, when the user recognizes any trouble, the item "trouble with the rotation of the motor occurs" is selected on the setting screen for troubleshooting shown in FIG. 12A corresponding to FIG. 5A, and when the user does not recognize any trouble, the item "no trouble" is selected, and after the selection, the screen is shifted to the determination screen shown in FIG. 5B to input the final determination of troubleshooting. In this modification, the third trouble signal is output only when the item "trouble with the rotation of the motor occurs" is selected, and no trouble signal is output when the item "no trouble" is selected.

Figure 13:
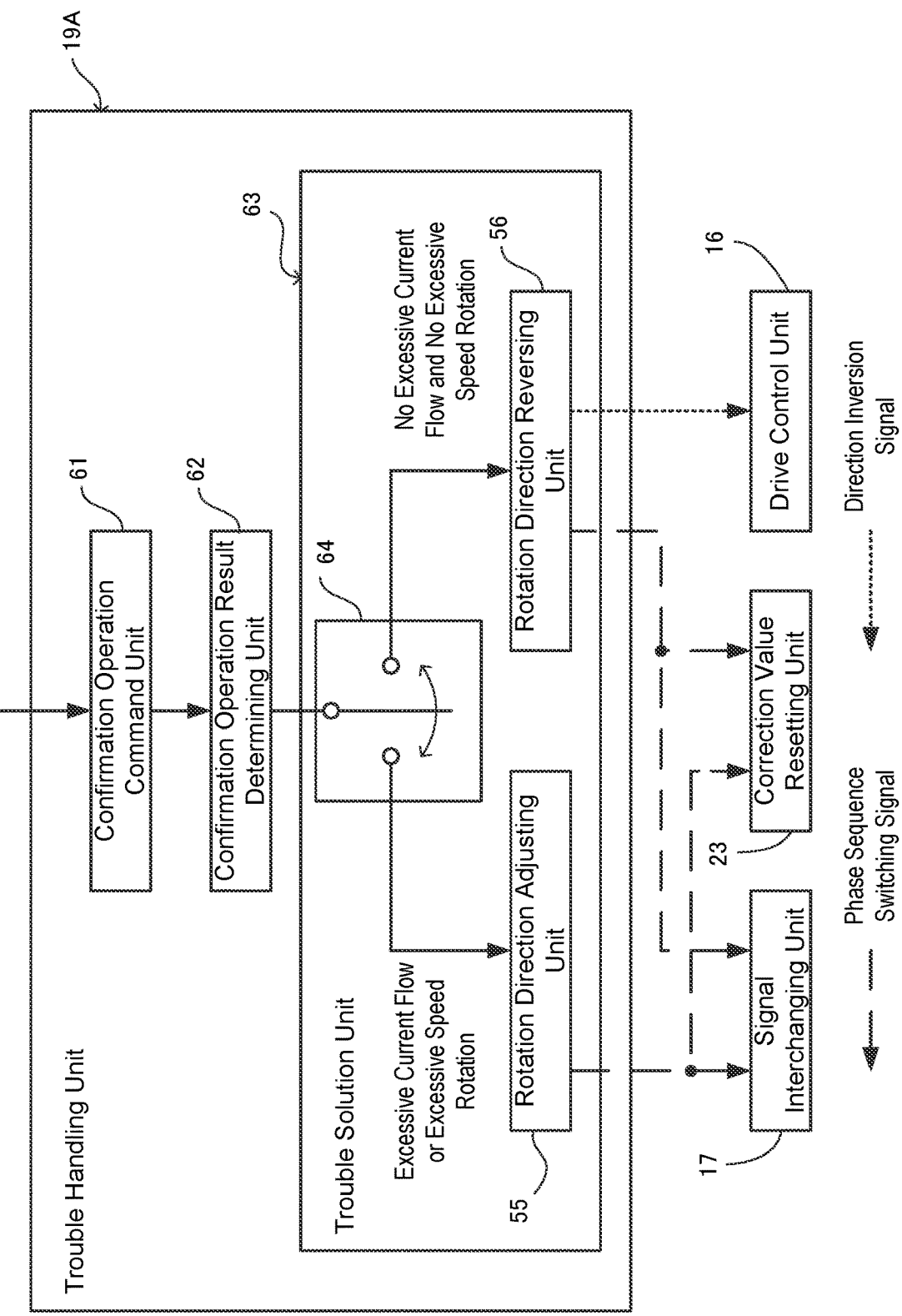
FIG. 13 is a diagram showing an example of the block configuration of the trouble handling unit in the case of inputting only the presence of trouble.

The trouble handling unit 19A of this modification to which the third trouble signal is input performs internal processing of a block configuration as shown in FIG. 13 corresponding to FIG. 8. In FIG. 13, the trouble handling unit 19A of this modification includes a confirmation operation command unit (confirmation operation command circuitry) 61, a trouble decision unit (trouble decision circuitry) 62, and a trouble solution unit (trouble solution circuitry) 63.

When the third trouble signal is input from the operation unit 15, the confirmation operation command unit 61 commands the drive control unit 16 to perform the confirmation operation of stopping the motor 4 after starting the motor 4. In the confirmation operation, for example, the drive control unit 16 is instructed to operate the motor 4 for a time period in which each of the motor current signal and the motor speed can be sufficiently detected. The operation time and the command speed for the operation may be set by the operation unit 15, for example, or may be acquired as a setting signal from the outside of the motor control apparatus 3.

The trouble decision unit 62 determines whether the motor 4 is in an excessive current state or in an excessive speed state based on the motor current signal and the motor speed detected during the confirmation operation of the motor 4. Alternatively, it may be determined whether or not the protection function is generated and stopped as a result of generation of excessive current or excessive speed. The protection function in this case includes, for example, a protection function based on detection of overcurrent, overload, overspeed, or excessive speed deviation.

The trouble solution unit 63 executes a means for solving the trouble based on the determination result of the trouble decision unit 62. The trouble solution unit 63 includes a determination result determining unit 64 that determines the determination result, rotation direction adjusting unit 55, and a rotation direction reversing unit 56.

When the trouble decision unit 62 determines that the motor 4 is in the excessive current state or the excessive speed state, the determination result determining unit 64 determines that the protection stop trouble has occurred. In this case, the determination result determining unit 64 inputs a signal indicating that the protection stop trouble has occurred to the rotation direction adjusting unit 55 to operate the rotation direction adjusting unit 55. The rotation direction adjusting unit 55 causes the signal interchanging unit 17 and the correction value resetting unit 23 in the case where the motor 4 is a synchronous motor to execute a rotation direction adjusting process for outputting a phase sequence interchanging signal (indicated by a symbol of a selection switch in the drawing). Instead of outputting the phase sequence switching signal, the rotation direction adjusting unit 55 may output a direction inversion signal to the sign switching unit 36 of the drive control unit 16.

When the trouble decision unit 62 determines that the motor 4 is neither in the excessive current state nor in the excessive speed state, the determination result determining unit 64 determines that the opposite direction rotation trouble has occurred. In this case, the determination result determining unit 64 inputs a signal indicating that the opposite direction rotation trouble has occurred to the rotation direction reversing unit 56 to operate the rotation direction reversing unit 56. The rotation direction reversing unit 56 outputs a phase sequence switching signal respectively to the signal interchanging unit 17 and the correction value resetting unit 23 when the motor 4 is a synchronous motor, and executes a rotation direction reversing process for outputting a direction reversing signal to the sign switching unit 36 of the drive control unit 16.

As described above, the trouble handling unit 19A in this modification performs the checking operation of the motor 4 when the third trouble signal is input, and selectively executes one of the rotational direction adjusting process by the rotational direction adjusting unit 55 and the rotational direction reversing process by the rotation direction reversing unit 56 based on the determination result of the motor current signal and the motor speed during the checking operation.

Figure 14:
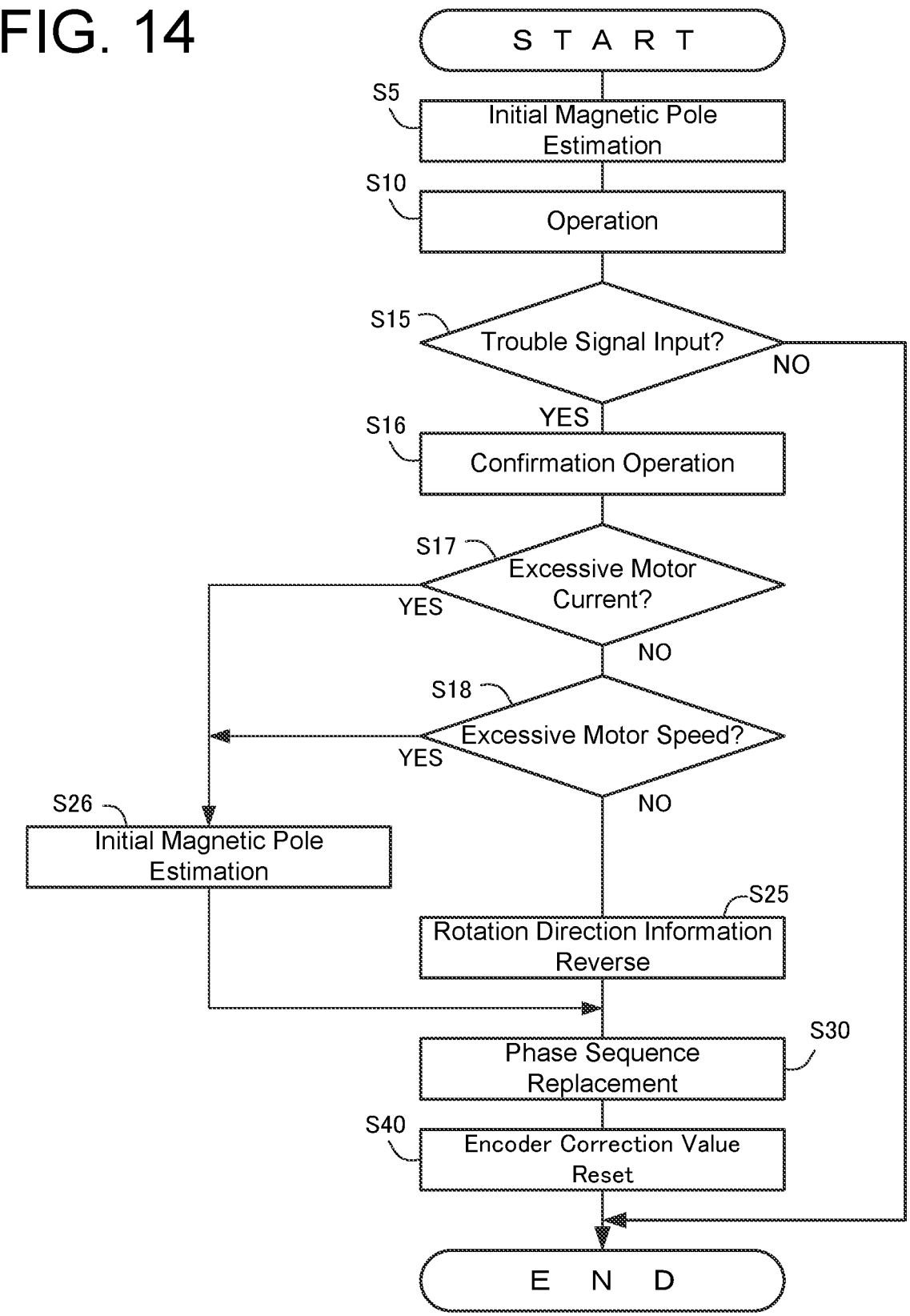
FIG. 14 is a flowchart showing an example of a control procedure of a process executed by the CPU of the motor control apparatus in the case of inputting only the presence of a trouble.

FIG. 14 shows a flowchart of a control procedure executed by the CPU of the motor control apparatus 3 in order to realize the method of coping with the trouble in the present modification described above. In the flowchart of FIG. 14, steps S16, S17, and S18 are sequentially executed instead of step S20 in the flowchart of FIG. 11. Hereinafter, only the procedures of steps S16, S17, and S18 will be described, and descriptions of other equivalent procedures will be omitted.

First, in the determination of step S15, when the third trouble signal is input, the determination is satisfied (S15: YES), and the CPU of the motor control apparatus 3 proceeds to step S16.

In step S16, the CPU of the motor control apparatus 3 causes the drive control unit 16 to execute the confirmation operation, and detects the motor current signal and the motor speed during the confirmation operation. The procedure of the step S16 corresponds to the confirmation operation command unit 61.

Next, the process proceeds to step S17, and the CPU of the motor control apparatus 3 determines whether or not the motor current detected during the confirmation operation of step S16 is excessive. This determination includes determination as to whether or not the motor is stopped by the protection function due to excessive motor current. When the motor current detected during the confirmation operation is not excessive, the determination is not satisfied (S17: NO), and the process proceeds to step S18.

In the step S18, the CPU of the motor control apparatus 3 determines whether or not the motor speed detected during the confirmation operation of the step S16 is excessive. This determination includes a determination as to whether or not the motor is stopped by the protection function due to an excessive motor speed. When the motor speed detected during the confirmation operation is not excessive, the determination is not satisfied (S18: NO), and the process proceeds to step S25. The step S17 and the step S18 correspond to the trouble decision unit 62.

On the other hand, in the determination of step S17, when the motor current detected during the confirmation operation is excessive or when the motor is stopped by the protection function, the determination is satisfied (S17: YES), and the process proceeds to step S26.

On the other hand, in the determination of the step S18, when the motor speed detected during the confirmation operation is excessive, or when the motor is stopped by the protection function, the determination is satisfied (S18: YES), and the process proceeds to step S26.

As described above, in the elevator drive system 100 of the present modification, when the user inputs "trouble occurred" to the operation unit 15, the corresponding third trouble signal is input from the operation unit 15 to the trouble handling unit 19A via the trouble signal receiving unit 18. Then, a confirmation operation command unit 61 causes a drive control unit 16 to perform confirmation operation for stopping the motor 4 after starting, a trouble decision unit (trouble decision circuitry) 62 determines whether the motor 4 is in an excessive current or excessive speed state during the confirmation operation, and a trouble solution unit 63 selectively executes either one of rotation direction adjusting process and rotation direction reversing process based on the determination result of the trouble decision unit 62.

Thereafter, the drive control unit 16 generates the drive signal based on the phase sequence and the motor rotation signal after the execution of the rotation direction trouble solving means by the trouble solution unit as described above. As described above, the motor control apparatus 3 can automatically execute the solving means corresponding to the cause of the rotational direction trouble and quickly solve the trouble only by inputting the trouble to the motor control apparatus 3 by the operator, for example, at the time of test operation. As a result, the operator can raise and lower the elevator car 66 in a desired manner. Also in this modification, the signal interchanging unit 17 may be provided between the voltage command generation unit 32 and the PWM conversion unit 35. In this case, the rotation direction adjusting unit 55 outputs the phase sequence switching signal to the signal interchanging unit 17 provided inside the drive control unit 16.

<13-2: Case of Performing Phase Sequence Replacement Processing by Wiring Phase Sequence Replacement>

In the above embodiment, the phase sequence of the motor 4 is changed by changing the signal phase sequence of the drive signal output from the drive control unit 16. Alternatively, the phase sequence switching process may be performed by switching the wiring phase sequence of the power supply lines 24 that supply three-phase drive power from the inverter bridge 11*c* of the power conversion unit 11 to the motor 4.

Figure 15:
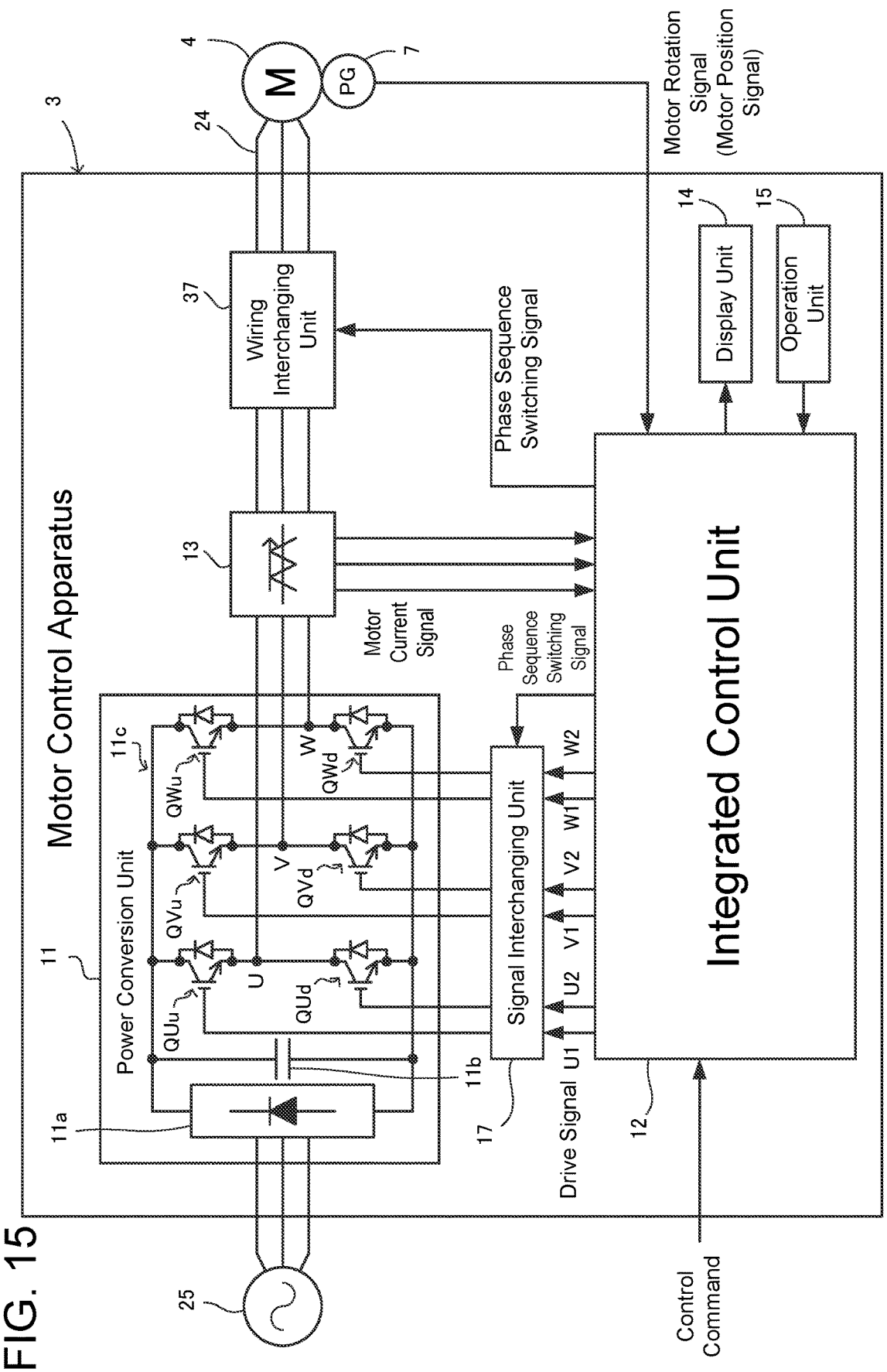
FIG. 15 is a diagram showing an example of a block configuration inside the motor control apparatus including the wiring interchanging unit.
Figure 16:
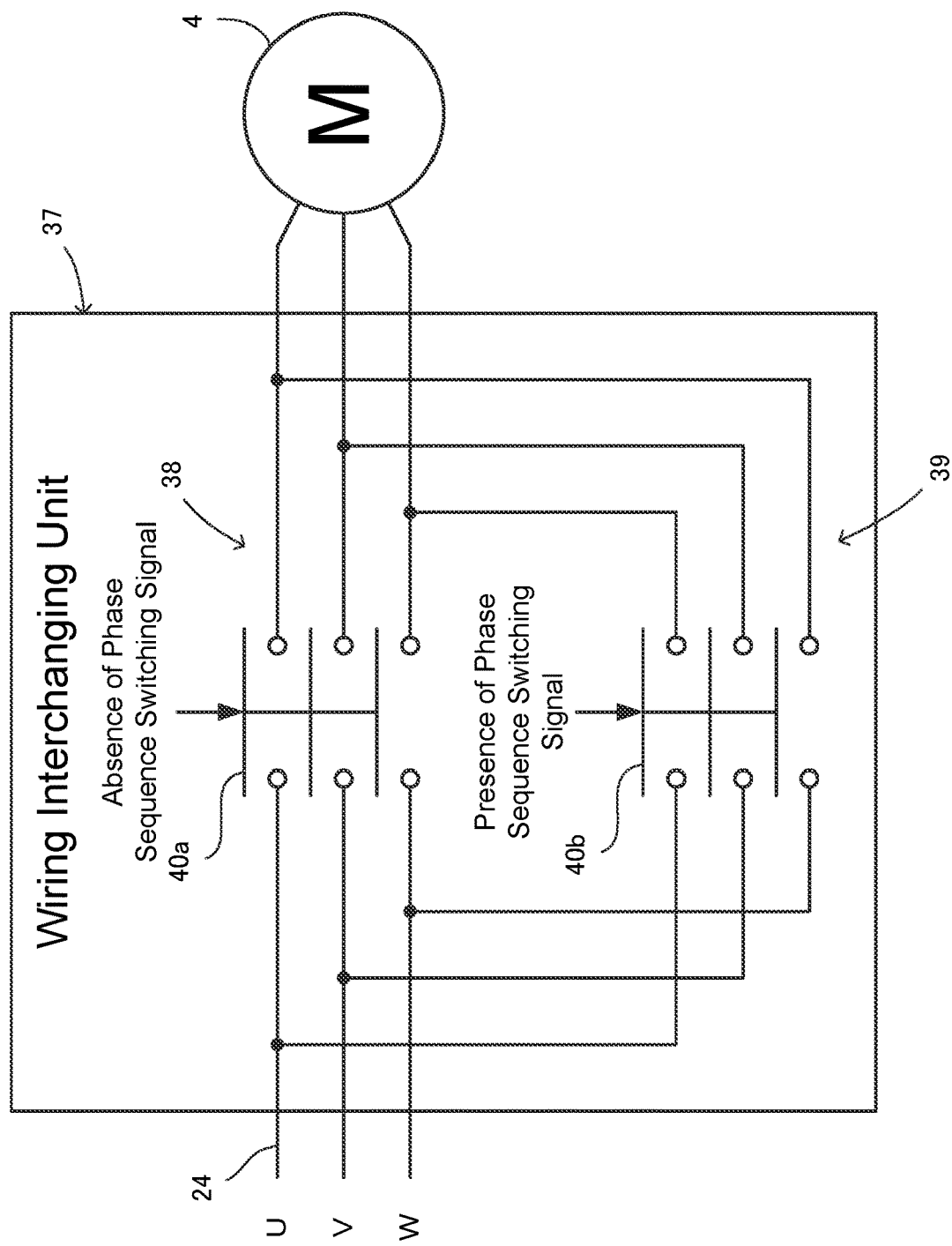
FIG. 16 is a diagram showing an example of an internal circuit of the wiring interchanging unit 37.

In this case, as shown in FIG. 15 corresponding to FIG. 2, the signal interchanging unit 17 is omitted, the drive signal output from the drive control unit 16 is input to the inverter bridge 11*c* of the power conversion unit 11 as it is, and a wiring interchanging unit 37 is provided on the power supply line 24 that supplies drive power from the inverter bridge 11*c* to the motor 4. As shown in FIG. 16, the wiring interchanging unit 37 includes a direct path 38 (upper path in FIG. 16) for connecting the power supply lines 24 in the original UVW phase sequence and an switching path 39 (lower path in FIG. 16) for interchanging and connecting the U-phase and the W-phase in this example in parallel, and switches 40*a* and 40*b* for individually switching between connection and disconnection in each path. When the phase sequence switching signal is not input from the trouble handling unit 19, the switch 40*a* of the direct path 38 is turned on and the switch 40*b* of the switching path 39 is turned off. When the phase sequence switching signal is input from the trouble handling unit 19, the switch 40*a* of the direct path 38 is cut off and the switch 40*b* of the switching path 39 is turned on. As a result, the replacement processing of the trouble handling unit 19 can be realized functionally and easily as in the case of the signal interchanging unit 17. Note that both the signal interchanging unit 17 and the wiring interchanging unit 37 may be provided, and the trouble handling unit 19 may input the phase sequence interchanging signal to one or both of the two interchanging units 17 and 37 and to perform a single or double phase sequence interchanging process.

Even when the first trouble signal of the protection stop trouble is input and the protection stop trouble can be solved by executing the rotation direction adjusting process to cope with the first trouble signal, the opposite direction rotation trouble may occur as a result. Therefore, both the signal interchanging unit 17 and the wiring interchanging unit 37 may be provided, and after the rotation direction adjusting process using the signal interchanging unit 17 is executed in response to the input of the first trouble signal and the protection stop trouble is solved, the phase sequence of the rotation direction reversing process may be changed using the wiring interchanging unit 37 in response to the input of the second trouble signal.

<13-3: Case where Matrix Converter is Provided>

Figure 17:
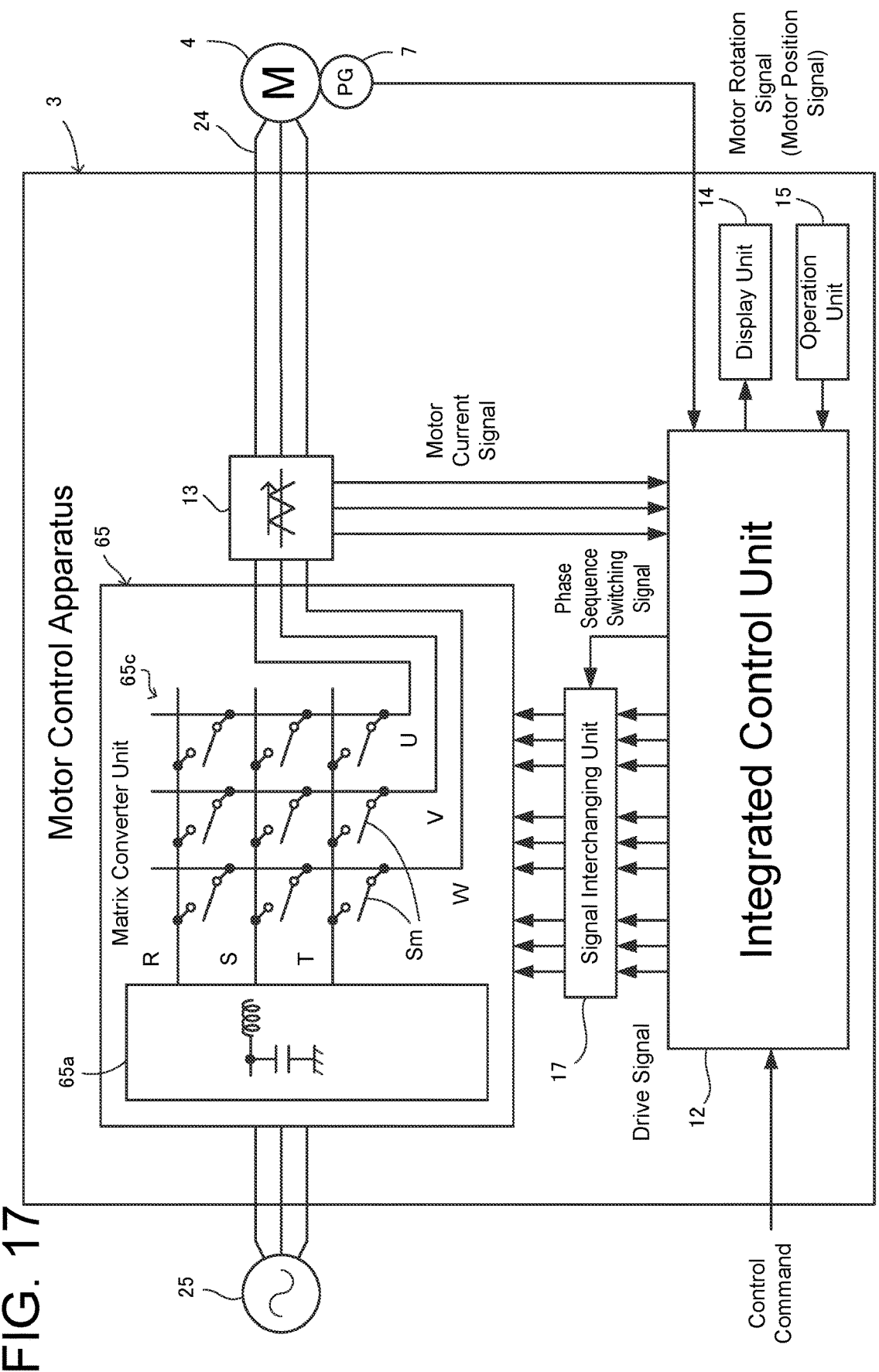
FIG. 17 is a diagram showing an example of an internal block configuration of a motor control apparatus 3 including a matrix converter.

In the above-described embodiment, the power conversion unit includes the rectifier bridge 11*a* and the smoothing capacitor 11*b* that convert AC power from a commercial power supply into DC power, and the inverter bridge 11*c* that converts DC power into AC power. Alternatively, as shown in FIG. 17 corresponding to FIG. 2, a so-called matrix converter unit 65 may be provided as the power conversion unit.

The matrix converter unit 65 includes an input filter 65*a* constituted by three LC filters connected to the respective phases of the RST of the three-phase AC power supply 25, and a switch unit 65*c* connected between the input filter 65*a* and the motor 4. The switch unit 65*c* has nine semiconductor bidirectional switches Sm capable of bidirectionally conducting and cutting off current in a matrix arrangement corresponding to each combination of three input phases of the RST and three output phases of the UVW. The semiconductor bidirectional switch Sm is realized by, for example, connecting two reverse blocking IGBTs in antiparallel or connecting two sets of an IGBT having no reverse blocking capability and a diode connected in series in antiparallel.

In contrast, the integrated control unit 12 (drive control unit 16) outputs appropriate drive signals to each of the nine semiconductor bidirectional switches Sm, and thereby three-phase drive power with an arbitrary amplitude and frequency can be supplied to the motor 4. The matrix converter unit may have six semiconductor bidirectional switches Sm arranged in a matrix corresponding to the combination of the three input phases of the RST and the two DC output phases of the PN to drive the DC motor.

In the configuration in which the matrix converter unit 65 is provided in the power conversion unit as described above, the protection stop trouble and the opposite direction rotation trouble can be dealt with by the completely same configuration as that of the embodiment in which the power conversion unit 11 of the inverter bridge 11*c* is provided except that the PWM conversion unit 35 detects the phase of the input voltage and selects the semiconductor bidirectional switch Sm to be actually turned on according to the detected phase.

As described above, the elevator drive system 100 of the present modification further includes the matrix converter unit 65 that includes the semiconductor bidirectional switch Sm, converts the input AC power into the output AC power, and supplies the output AC power to the motor 4, and the drive control unit 16 outputs the on/off signal of the semiconductor bidirectional switch Sm based on the drive signal to control the semiconductor bidirectional switch Sm. Thus, as compared with the configuration of the power conversion unit 11 of the embodiment including the inverter bridge 11c, it is possible to achieve high efficiency in power conversion from commercial three-phase AC power to three-phase AC drive power supplied to the motor 4 and high reliability by eliminating an electrolytic capacitor for DC voltage smoothing.

14: Hardware Configuration Example of Motor Control Apparatus

Next, with reference to FIG. 18, a description will be given of a hardware configuration example of the motor control apparatus 3 that realizes processing by the drive control unit 16, the signal interchanging unit 17, the trouble signal receiving unit 18, the trouble handling unit 19, the motor signal receiving unit 51, the correction value setting unit 20, the correction value resetting unit 23, and the like implemented by the program executed by the CPU901 described above.

Figure 18:
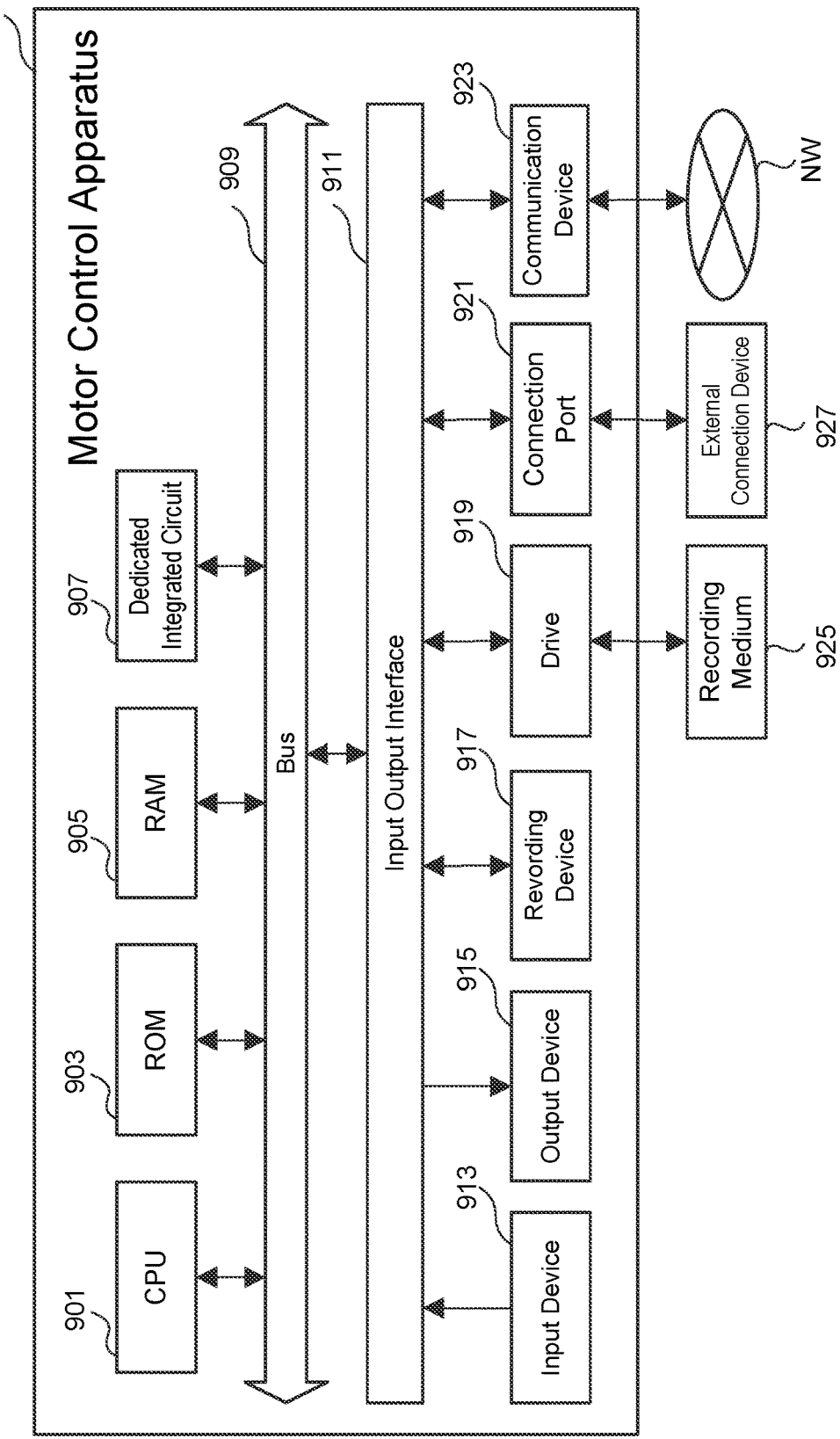
FIG. 18 is a block diagram showing an example of the hardware configuration of the motor control apparatus 3.

As illustrated in FIG. 18, the motor control apparatus 3 includes, for example, CPU901, ROM903, RAM905, dedicated integrated circuits 907 constructed for specific applications such as ASICs or FPGAs, an input device 913, an output device 915, a recording device 917, a drive 919, a connection port 921, and a communication device 923. These components are connected to each other via a bus 909 and an input/output interface 911 so that signals can be transmitted therebetween.

The program can be recorded in, for example, a ROM903, a RAM905, or the recording device 917.

In addition, the program may be temporarily or permanently recorded in a removable recording medium 925 such as a magnetic disk such as a flexible disk, various optical disks such as a CD, an MO disk, and a DVD, and a semiconductor memory. Such a recording medium 925 can also be provided as so-called package software. In this case, the program recorded in the recording medium 925 may be read by the drive 919 and recorded in the recording device 917 via the input/output interface 911, the bus 909, or the like.

Further, the program may be recorded in, for example, a download site, another computer, another recording device, or the like (not shown). In this case, the program is transferred via a network NW such as a LAN or the Internet, and the communication device 923 receives the program. The program received by the communication device 923 may be recorded in the recording device 917 via the input/output interface 911, the bus 909, or the like.

The program may be recorded in an appropriate external connection device 927, for example. In this case, the program may be transferred via an appropriate connection port 921 and recorded in the recording device 917 via the input/output interface 911, the bus 909, or the like.

When the CPU901 executes various processes according to the program recorded in the recording device 917, the processes by the drive control unit 16, the signal interchanging unit, the trouble signal receiving unit 18, the trouble handling unit 19, the motor signal receiving unit 51, the correction value setting unit 20, the correction-value resetting unit 23, and the like are realized. At this time, the CPU901 may directly read the program from the recording device 917 and execute the program, or may temporarily load the program into the RAM905 and execute the program. Further, for example, when the CPU901 receives the program via the communication device 923, the drive 919, or the connection port 921, the received program may be directly executed without recording the program in the recording device 917.

In addition, the CPU901 may perform various processes based on signals or information input from the input device 913 such as a mouse, a keyboard, and a microphone (not illustrated).

Then, the CPU901 may output the result of execution of the above processing from the output device 915 such as a display device or an audio output device, and further, the CPU901 may transmit the processing result via the communication device 923 or the connection port 921 as necessary, or may record the processing result in the recording device 917 or the recording medium 925.

In the above description, when there is a description of a value serving as a predetermined determination criterion or a value serving as a delimiter, such as a threshold value or a reference value, "identical", "equal", "different", and the like with respect to these values have strict meanings. For example, when these terms are used terms "substantially the same", "substantially equal", and "substantially different" mean "substantially the same", "substantially the same", and "substantially different" because design and manufacturing tolerances and errors are allowed when these terms are used with respect to, for example, dimensions and sizes in appearance.

What is claimed is:

1. A motor control apparatus comprising:
   control circuitry configured to output, in accordance with a phase sequence with respect to a motor, a drive command signal which is generated based on a motor rotation signal output from a motor rotation detector to control the motor; and
   rotation direction adjusting circuitry configured to match the phase sequence with rotation direction information included in the motor rotation signal if a first trouble signal showing excessive motor current or excessive motor speed is input via an operation unit,
   wherein the rotation direction adjusting circuitry is configured to interchange the phase sequence to generate interchanged phases if the first trouble signal is input,
   wherein the motor is a synchronous motor, and
   wherein the control circuitry is configured to generate the drive command signal based on a magnetic pole position signal of the synchronous motor based on the motor rotation signal and is configured to detect an initial magnetic pole position in accordance with the first trouble signal.

2. The motor control apparatus according to claim 1, wherein the rotation direction adjusting circuitry is configured to invert the rotation direction information if the first trouble signal is input.

3. The motor control apparatus according to claim 2,
   wherein the motor rotation signal includes an A-phase pulse signal and a B-phase pulse signal which has a phase different from a phase of the A-phase pulse signal by 90°, and
   wherein the rotation direction adjusting circuitry is configured to invert the rotation direction information by switching from a first condition to a second condition or from a second condition to a first condition, the first condition corresponding to a condition in which a forward rotation direction is defined such that the A-phase pulse signal is ahead of the B-phase pulse signal and a reverse rotation direction is defined such that the A-phase pulse signal is behind the B-phase pulse signal, the second condition corresponding to a condition in which the reverse rotation direction is defined such that the A-phase pulse signal is ahead of the B-phase pulse signal and the forward rotation direction is defined such that the A-phase pulse signal is behind the B-phase pulse signal.

4. The motor control apparatus according to claim 1, further comprising:
correction value setting circuitry configured to set a correction value for the magnetic pole position based on the magnetic pole position at a time of generation of a detection origin signal of the motor rotation detector in a predetermined period; and
correction value resetting circuitry configured to perform a predetermined resetting process on the correction values set by the correction value setting circuitry in response to the first trouble signal.

5. The motor control apparatus according to claim 4,
wherein, when the magnetic pole position signal is calculated based on the interchanged phases by a rotation direction reversing process, the correction value resetting circuitry is configured to generate a reset correction value based on the correction value whose positive and negative signs are reversed and phase differences between the two phases of the interchanged phases; and
wherein, when the magnetic pole position signal is not calculated based on the interchanged phases by the rotation direction reversing process, the correction value resetting circuitry is configured to generate the reset correction value based on the correction value whose positive and negative signs are reversed.

6. A motor control apparatus comprising:
control circuitry configured to output, in accordance with a phase sequence with respect to a motor, a drive command signal which is generated based on a motor rotation signal output from a motor rotation detector to control the motor; and
rotation direction reversing circuitry configured to perform rotation direction reversing process to reverse a motor rotation direction with respect to the drive command signal according to a second trouble signal showing a rotation direction error of the motor,
wherein the rotation direction reversing circuitry is configured to reverse rotation direction information included in the motor rotation signal and to interchange the phase sequence,
wherein the motor rotation signal includes an A-phase pulse signal and a B-phase pulse signal which has a phase different from a phase of the A-phase pulse signal by 90°,
wherein the rotation direction reversing circuitry is configured to reverse the rotation direction information by switching from a first condition to a second condition or from a second condition to a first condition, the first condition corresponding to a condition in which a forward rotation direction is defined such that the A-phase pulse signal is ahead of the B-phase pulse signal and a reverse rotation direction is defined such that the A-phase pulse signal is behind the B-phase pulse signal, the second condition corresponding to a condition in which the reverse rotation direction is defined such that the A-phase pulse signal is ahead of the B-phase pulse signal and the forward rotation direction is defined such that the A-phase pulse signal is behind the B-phase pulse signal, and
wherein the motor is a synchronous motor, and the control circuitry is configured to generate the drive command signal based on a magnetic pole position signal of the synchronous motor based on the motor rotation signal, the control circuitry further comprising:
correction value setting circuitry configured to set a correction value for the magnetic pole position signal based on the magnetic pole position signal at a time of generation of a detection origin signal of the motor rotation detector in a predetermined period; and
correction value resetting circuitry configured to perform a predetermined resetting process on the correction values set by the correction value setting circuitry in response to the second trouble signal.

7. The motor control apparatus according to claim 6,
wherein, when the magnetic pole position signal is calculated based on the interchanged phases by a rotation direction reversing process, the correction value resetting circuitry is configured to generate a reset correction value based on the correction value whose positive and negative signs are reversed and phase differences between the two phases of the interchanged phases, and
wherein, when the magnetic pole position signal is not calculated based on the interchanged phases by the rotation direction reversing process, the correction value resetting circuitry is configured to generate the reset correction value based on the correction value whose positive and negative signs are reversed.

8. A motor control apparatus comprising:
control circuitry configured to output, in accordance with a phase sequence with respect to a motor, a drive command signal which is generated based on a motor rotation signal output from a motor rotation detector to control the motor;
confirmation operation command circuitry configured to command the control circuitry to perform a confirmation operation for stopping the motor after starting the motor in response to a third trouble signal caused by excessive current or excessive speed of the motor or erroneous rotation direction of the motor;
trouble decision circuitry configured to determine whether the motor is in an excessive current state or an excessive speed state during the confirmation operation; and
trouble solution circuitry configured to solve a trouble corresponding to the third trouble signal based on the determination result of the trouble decision circuitry,
wherein, when the trouble decision circuitry determines that the motor is in an excessive current state or an excessive speed state, the trouble solution circuitry performs a rotation direction adjusting process for matching a predetermined phase sequence of the motor when the control circuitry outputs the drive command signal with rotation direction information included in the motor rotation signal, and when the motor is determined to be neither in an excessive current state nor in an excessive speed state, the trouble solution circuitry performs a rotation direction reversing process for reversing the rotation direction of the motor with respect to the drive command signal.

9. The motor control apparatus according to claim 8, wherein the trouble solution circuitry is configured to invert the rotation direction information if the third trouble signal is input.

10. The motor control apparatus according to claim 9,
wherein the motor rotation signal includes an A-phase pulse signal and a B-phase pulse signal which has a phase different from a phase of the A-phase pulse signal by 90°, and wherein the trouble solution circuitry is configured to invert the rotation direction information by switching from a first condition to a second condition or from a second condition to a first condition, the first condition corresponding to a condition in which a forward rotation direction is defined such that the A-phase pulse signal is ahead of the B-phase pulse signal and a reverse rotation direction is defined such that the A-phase pulse signal is behind the B-phase pulse signal, the second condition corresponding to a condition in which the reverse rotation direction is defined such that the A-phase pulse signal is ahead of the B-phase pulse signal and the forward rotation direction is defined such that the A-phase pulse signal is behind the B-phase pulse signal.

11. The motor control apparatus according to claim 8, wherein the trouble solution circuitry is configured to interchange the phase sequence to generate interchanged phases if the third trouble signal is input.

12. The motor control apparatus according to claim 8, wherein the trouble solution circuitry is configured to reverse rotation direction information included in the motor rotation signal and to interchange the phase sequence.

13. The motor control apparatus according to claim 8, wherein the motor is a synchronous motor,
wherein the control circuitry is configured to generate the drive command signal based on a magnetic pole position signal of the synchronous motor based on the motor rotation signal, and
wherein the control circuitry is configured to detect an initial magnetic pole position when the trouble decision circuitry determines that the motor is in an excessive current state or an excessive speed state during the confirmation operation.

14. The motor control apparatus according to claim 13, further comprising:
correction value setting circuitry configured to set a correction value for the magnetic pole position based on the magnetic pole position at a time of generation of a detection origin signal of the motor rotation detector in a predetermined period; and
correction value resetting circuitry configured to perform a predetermined resetting process on the correction values set by the correction value setting circuitry when the trouble solution circuitry performs a predetermined phase sequence interchanging process or the rotation direction reversing process to the motor as the rotation direction adjusting process.

15. The motor control apparatus according to claim 14, wherein, when the magnetic pole position signal is calculated based on the interchanged phases by a rotation direction reversing process, the correction value resetting circuitry is configured to generate a reset correction value based on the correction value whose positive and negative signs are reversed and phase differences between the two phases of the interchanged phases, and
wherein, when the magnetic pole position signal is not calculated based on the interchanged phases by the rotation direction reversing process, the correction value resetting circuitry is configured to generate the reset correction value based on the correction value whose positive and negative signs are reversed.

\* \* \* \* \*